US009009216B2

(12) United States Patent
Hakoda et al.

(10) Patent No.: US 9,009,216 B2
(45) Date of Patent: Apr. 14, 2015

(54) SERVER DEVICE, AND METHOD AND PROGRAM FOR PROCESSING ON THE SAME

(75) Inventors: Kotaro Hakoda, Osaka (JP); Hidehiko Shin, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 563 days.

(21) Appl. No.: 12/673,879

(22) PCT Filed: Jun. 16, 2009

(86) PCT No.: PCT/JP2009/002724
§ 371 (c)(1),
(2), (4) Date: Feb. 17, 2010

(87) PCT Pub. No.: WO2009/153967
PCT Pub. Date: Dec. 23, 2009

(65) Prior Publication Data
US 2011/0179104 A1 Jul. 21, 2011

(30) Foreign Application Priority Data

Jun. 17, 2008 (JP) ................................. 2008-157732
Jun. 17, 2008 (JP) ................................. 2008-157733

(51) Int. Cl.
*G06F 15/16* (2006.01)
*G11B 27/34* (2006.01)
(Continued)

(52) U.S. Cl.
CPC ............ *G11B 27/34* (2013.01); *H04L 12/2805* (2013.01); *H04L 12/281* (2013.01);
(Continued)

(58) Field of Classification Search
CPC .......... H04N 21/6582; H04N 21/4335; H04N 21/47202

USPC .......... 709/201, 202, 203, 213, 216, 208, 209
See application file for complete search history.

(56) References Cited

U.S. PATENT DOCUMENTS 6,167,441 A   12/2000  Himmel
6,182,109 B1   1/2001  Sharma et al.
(Continued)

FOREIGN PATENT DOCUMENTS

CN   1783930   6/2006
CN   1977268   6/2007
(Continued)

OTHER PUBLICATIONS

International Search Report issued Sep. 1, 2009 in International (PCT) Application No. PCT/JP2009/002724.
(Continued)

*Primary Examiner* — Dhairya A Patel
(74) *Attorney, Agent, or Firm* — Wenderoth, Lind & Ponack, L.L.P.

(57) ABSTRACT

A server device which makes a function equivalent to its own function available on an old-generation client device inferior in functionality includes a request receiving unit which receives from the client device a request for processing using a function which the client device lacks, a device status determination unit which determines whether or not the server device is capable of the requested processing depending on statuses indicated by status information tables, and, when it is determined that the server device is capable of it, specifies alternative processing corresponding to a function for the requested processing among functions of the server device with reference to a function information table, an alternative-processing providing unit which performs the specified alternative processing, and a transmission unit which transmits data generated through the performing of the alternative processing to the client device.

21 Claims, 24 Drawing Sheets

(51) Int. Cl.
*H04L 12/28* (2006.01)
*H04N 5/783* (2006.01)
*H04N 21/21* (2011.01)
*H04N 21/23* (2011.01)
*H04N 21/24* (2011.01)
*H04N 21/442* (2011.01)
*H04N 21/458* (2011.01)
*H04N 21/658* (2011.01)
*H04N 21/4335* (2011.01)
*H04N 21/472* (2011.01)

(52) U.S. Cl.
CPC .............. *H04N 5/783* (2013.01); *H04N 21/21* (2013.01); *H04N 21/23* (2013.01); *H04N 21/2405* (2013.01); *H04N 21/4335* (2013.01); *H04N 21/4424* (2013.01); *H04N 21/4583* (2013.01); *H04N 21/47202* (2013.01); *H04N 21/6582* (2013.01)

(56) References Cited

U.S. PATENT DOCUMENTS

| | | | |
|---|---|---|---|
| 7,831,691 B2 | 11/2010 | Aoki | |
| 7,984,177 B2 * | 7/2011 | Girardeau et al. | 709/231 |
| 8,015,584 B2 | 9/2011 | Breen et al. | |
| 8,488,181 B2 * | 7/2013 | Wu et al. | 358/1.18 |
| 2002/0078195 A1 * | 6/2002 | Allen | 709/224 |
| 2003/0033359 A1 | 2/2003 | Asoh | |
| 2003/0128227 A1 * | 7/2003 | Crow et al. | 345/700 |
| 2004/0078822 A1 | 4/2004 | Breen et al. | |
| 2006/0103875 A1 | 5/2006 | Aoki | |
| 2006/0117264 A1 * | 6/2006 | Beaton et al. | 715/751 |
| 2006/0259589 A1 * | 11/2006 | Lerman et al. | 709/219 |
| 2007/0260677 A1 * | 11/2007 | DeMarco et al. | 709/203 |
| 2007/0288549 A1 | 12/2007 | Shoji | |
| 2008/0027807 A1 * | 1/2008 | Matsumoto | 705/14 |
| 2008/0063005 A1 | 3/2008 | Roos | |
| 2009/0015433 A1 * | 1/2009 | James et al. | 340/825.69 |
| 2009/0047000 A1 * | 2/2009 | Walikis et al. | 386/124 |

FOREIGN PATENT DOCUMENTS

| | | |
|---|---|---|
| EP | 0 794 490 | 9/1997 |
| JP | 11-194983 | 7/1999 |
| JP | 2000-333269 | 11/2000 |
| JP | 2002-501238 | 1/2002 |
| JP | 2007-336369 | 12/2007 |
| JP | 2008-5445 | 1/2008 |
| JP | 2008-005445 | 1/2008 |
| WO | 99/35753 | 7/1999 |
| WO | 2004/036915 | 4/2004 |

OTHER PUBLICATIONS

Extended European Search Report issued May 8, 2013 in corresponding European Patent Application No. 09766415.5.
Scott Guelich et al., "CGI Programming with Perl", Jul. 1, 2000, XP055061347, URL: http://docstore.mik.ua/orelly/linux/cgi/ch03_03.htm.

* cited by examiner

FIG. 4

Setting information table 205a

| | Setting | Setting status |
|---|---|---|
| g1 | Registration of connected devices | OK |
| g2 | Maximum connected devices | N/A (Number of connected devices is not limited.) |
| g3 | Communication speed | OK |

FIG. 5

Conflict information table 205b

| Function name | Availability |
|---|---|
| fastforward | OK |
| rewind | OK |
| record | N/A |
| play | OK |
| rotate | OK |
| zoom-in | OK |
| zoom-out | OK |
| double-speedplay | OK |
| Triple-speedplay | OK | g11, g12, g13, g14, g15, g16, g17, g18, g19

FIG. 6

Function information table 206a

| Function name | Alternative processing name | Alternative processing URL |
|---|---|---|
| play | altplay | NONE |
| fastForward | altFastForward | http://A/BBB.cgi?function=altFastForward |
| rewind | altRewind | http://A/BBB.cgi?function=altRewind |
| rotate | altrotate | http://A/CCC.cgi?function=altRotate |
| zoom-in | altzoom-in | http://A/CCC.cgi?function=altzoomin |
| zoom-out | altzoom-out | http://A/CCC.cgi?function=altzoomout |
| double-speedplay | altdouble-speedplay | http://A/BBB.cgi?function=altdoublespeedplay |
| triple-speedplay | alttriple-speedplay | http://A/BBB.cgi?function=alttriblespeedplay | g21, g22, g23, g24, g25, g26, g27, g28

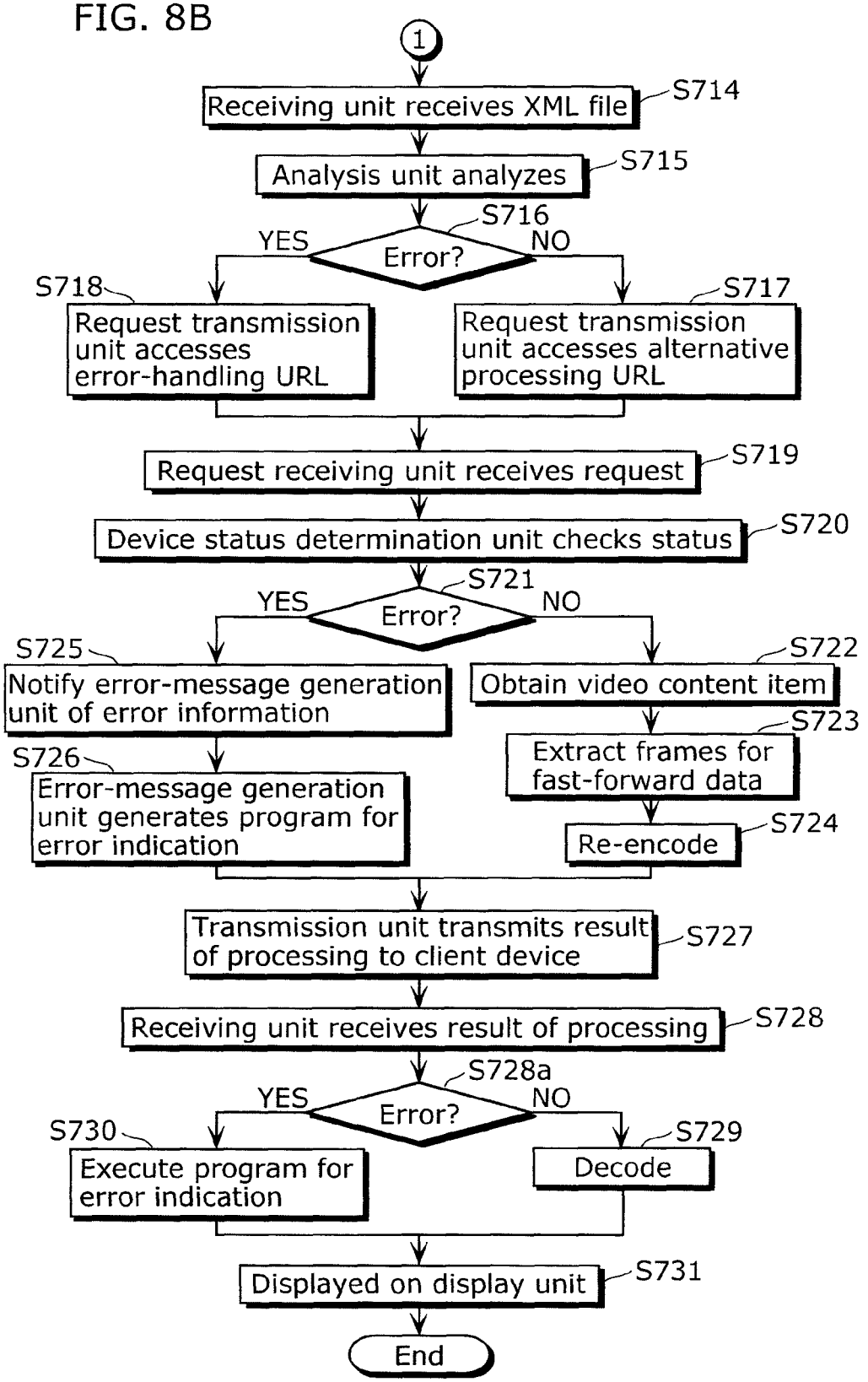

FIG. 9

File f1

```
<?xml version="1.0 encoding="utf-8" >
<result>
<setting>OK</setting>
<alternative>YES</alternative>
<competition>NO</competition>
<url>http://hostName/BBB.cgi?status=normal&function=altFastForward</url>
</result>
```

FIG. 10

File f2

```
<?xml version="1.0" encoding="utf-8">
<result>
<setting>OK</setting>
<alternative>YES</alternative>
<competition>YES</competition>
<url>http://hostName/error.cgi?status=abnormal&function=altFastForward&competition=yes</url>
</result>
```

SERVER DEVICE, AND METHOD AND PROGRAM FOR PROCESSING ON THE SAME

TECHNICAL FIELD

The present invention relates to a server device which provides remotely connected client devices with processing requested by the client devices.

BACKGROUND ART

In recent years, widespread broadband Internet connections and wireless network and improved techniques, such as the DLNA (Digital Living Network Alliance), for connection compatibility between digital consumer electronic devices allowed connection and communication between digital consumer electrical appliances other than PCs. New services have appeared where consumer electrical appliances, such as TVs and digital versatile disk (DVD) recorders or mobile phones and DVD recorders, are liked to allow remote recording setting, remote viewing, and so on. For example, new services have become available with which users play and view or download content such as videos and pictures in a server device from which a remote client device obtains a graphical user interface (GUI) for controlling the server device. However, there are sufficiently possible cases where connection of digital consumer electrical appliances is made between a new device and an old device, resulting in a function of the new device being unavailable from the old device. The server device, for example, may depict a picture with a special effect, but the client device may not. For video, the client device may perform a normal playback but not a double-speed playback.

There are known conventional techniques for such cases. Patent Reference 1 shows an exemplary one of the techniques. According to Patent Reference 1, when a server device receives, from the client device on which a browser is launched requests, a request for a GUI by HTTP communication, a server device obtains display capabilities of the client device and provides it with content depending on the capabilities. In order for the server device to obtain the display capabilities of the client device, a client smart agent of the server device analyzes header information of an HTTP request from the client device. In the case where the client smart agent has failed in analyzing header information, the server device sends the client smart agent to the client device so as to obtain information on the display capabilities recorded in an operation system or a BIOS. The server device customizes GUI content depending on the obtained display capabilities of the client device and provides the client device with the customized GUI content.

CITATION LIST

Patent Literature

Japanese Unexamined Patent Application Publication No. 11-194983

SUMMARY OF INVENTION

Technical Problem

For the server device described in the Patent Reference 1, there is a problem that, in the case where there is a difference in capabilities between the client device and the server device connected to each other, the GUI content displayed on the client device is different from the GUI content on the service device because the server device provides the GUI content customized depending on the display capabilities of the client device. It is usually preferable that the server device and the client device connected to each other show the same display in the case where both the server device and the client device are desired to display the same GUI content at the same time or in the case where the client device obtains a GUI program to control the server device for playing and viewing of video or still pictures in the server device.

The present invention, conceived to address the problem, has an object of providing a server device which makes a function equivalent to its own function available on an old-generation client device which is different from and inferior to the server device in functionality.

Solution to Problem

In order to achieve the object, a server device according to the present invention includes: a request receiving unit configured to receive, from the client device, a request for processing using a function which the client device lacks; a status information storage unit in which status information is stored, the status information indicating a status of the server device; a status determination unit configured to determine whether or not the server device is capable of performing requested processing, depending on the status of the server device indicated by the status information, the requested processing being the processing requested by the client device; a function information storage unit in which a function information table is stored, the function information table indicating, for each of functions which the server device includes, alternative processing which provides the client device with a result identical to a result of processing performed using the function which the server device includes; an alternative-processing specifying unit configured to specify alternative processing with reference to the function information table when the status determination unit determines that the server device is capable of performing the requested processing, the alternative processing corresponding to a function to be used for the requested processing among the functions which the server device includes; an alternative-processing providing unit configured to perform the alternative processing specified by the alternative-processing specifying unit; and a transmission unit configured to transmit data generated through performance of the alternative processing by the alternative-processing providing unit to the client device.

For example, a server device includes functions of playback, stop, fast-forward, and rewind of video content items. A client device, on the other hand, is of a generation older than the server device and includes only functions of playback and stop. When the server device according to the present invention receives a request for processing such as fast-forwarding, which is unavailable on the client device, the server device performs alternative processing corresponding to the fast-forwarding, and then transmits data generated by the processing to the client device. In other words, alternative processing is performed so that the client device is provided with a result which is identical to a result of processing of fast-forwarding performed on the server device, and then generated data is transmitted to the client device. The alternative processing may be, for example, thinning frames from a video content item to generate a fast-forwarded video content item. The fast-forwarded video content item is then transmitted to the client device. The client device, even without a fast-forward function, thereby displays a fast-forwarded video by playing the fast-forwarded video content item using a normal playback function. The present invention thus makes a function equivalent to a function of a server device available on an old-generation client device which is different from and inferior to the server device in functionality. Furthermore, the present invention, which makes a function equivalent to a function of a server device available on a client device, allows the client device to display the same operation screen as displayed on the server device in the case where, for example, the server device transmits a GUI program to the client device in order to cause the client device to display an operation screen which is GUI content.

Furthermore, the server device may include a GUI program storage unit in which a graphical user interface (GUI) program is stored, the GUI program causing the client device to (i) display an operation screen indicating at least one function which the server device includes and (ii) request the server device to perform processing using a function selected from the at least one function; wherein the transmission unit is further configured to transmit the GUI program to the client device, and the request receiving unit is configured to receive a request for processing using a function which the server device includes but the client device lacks, the request made through execution of the GUI program by the client device.

For example, the GUI program further causes the client device to (i) determine whether the client device has or lacks the selected function and (ii) perform processing using the selected function when it is determined that the client device includes the selected function, and the GUI program requests the server device to perform processing using the selected function when it is determined that the client device lacks the selected function.

This allows a user of the client device to select a function which the client device lacks but the server device includes, so that the server device can perform alternative processing when receiving a request for processing using the function.

Furthermore, the GUI program may causes the client device to display the operation screen, the operation screen being a same as a server operation screen which is displayed on the server device and indicates the at least one function which the server device includes.

This makes the operation screen identical to the operation screen of the server, so that the user can operate the client device without an unnatural feeling.

Furthermore, the device information table may indicate, for each function which the server device includes, the function and alternative processing corresponding to the function, and the alternative-processing specifying unit may be further configured to (i) determine whether or not the function information table indicates the function to be used for the requested processing and (ii) specify the alternative processing, when the function information table indicates the function to be used for the requested processing and the status determination unit determines that the server device is capable of performing the requested processing.

With this, whether or not the requested processing is indicated in the function information table is determined, and thus a false operation which occurs because the function information table does not indicate the requested processing is prevented.

Furthermore, in the status information storage unit, a setting information table may be stored as the status information, the setting information table indicating whether or not individual settings of the server device are adequate, and the status determination unit may be configured to determine that the server device is capable of performing the requested processing when the setting information table indicates that all the settings are adequate.

With this, it is determined that requested processing cannot be performed when settings of the server device are inadequate, and thus alternative processing is not performed. A false operation which occurs because alternative processing is performed under inadequate settings is thus prevented.

Furthermore, in the status information storage unit, a conflict information table may be stored as the status information, the conflict information table indicating whether or not using each of the functions which the server device includes causes conflict with the other function of the server device, and the status determination unit may be configured to determine that the server device is capable of performing the requested processing when the conflict information table indicates that using the function for the requested processing causes no conflict.

With this, it is determined that requested processing cannot be performed when a conflict occurs, and thus alternative processing is not performed. A false operation which occurs because alternative processing is performed under inadequate settings is thus prevented.

Furthermore, the transmission unit may be further configured to notify the client device of a determination result which is a result of the determination by the status determination unit, the request receiving unit may be further configured to receive an access request generated by the client device depending on the result of determination, and the alternative-processing providing unit may be configured to perform the alternative processing depending on the access request received by the request receiving unit.

With this, the client device is notified of a determination result on a requested processing which the client device requested the server device to perform before alternative processing is performed. The client device thus determines whether or not it notifies the server device of an access request depending on the determination result, so that load on the server device is prevented from increasing.

The present invention may be implemented not only as such a server device but also as an integrated circuit, a method of processing operations of the server device, or a program which causes the server device to perform the processing operations, or a recording medium in which the program is stored.

A client device according to the present invention is a client device which obtains GUI data stored in the server device which is different from the client device in functionality, the client device includes: a GUI data analysis unit configured to generate a GUI program from the obtained GUI data; a client function unit configured to obtain a list of content items stored in the server device and further configured to include functions of the client function unit; a capability storage unit which stores information on the functions which the client function unit includes; a GUI program which displays the list of the content items obtained by the client function unit and extracts a difference function which the client function unit includes but the server device lacks using the information stored in the capability storage unit when a predetermined content item is selected from the list of the content items; and a display unit configured to display the extracted difference function in GUI content.

In the case, for example, where consumer electrical appliances work together, control of a server device from client devices becomes possible if a consumer electronic device which serves as the client device obtains GUI data stored in a consumer electronic device which serves as the server device.

However, the GUI data provided by the server device is not always usable because display capabilities are different among the client devices. The aforementioned Patent Reference 1 describes a technique that a server device obtains display capabilities of a client device on which a browser is launched in response to a request from the client device for GUI data, and then customizes the GUI data depending on the display capabilities to provide it with the client device.

For the technique described in the Patent Reference 1, a server device on the Internet may support a client device with an advanced function by updating functions of the server device on demand. However, there is a problem that, in the case where a home-use consumer electrical appliance serves as a server device, an advanced function of the client device cannot be performed sufficiently because update of functions of the server device is difficult. It is assumed that, for example, a client device obtains GUI data from a server device to use content items in the server device, and that the server device is inferior to the client device in functionality. In this case, the GUI data obtained by the client device is often intended for the server device inferior in functionality. Accordingly, there may be a problem that if a user uses the GUI data on the client device, a function which the client device include but the server device does not is not available to the user.

For the client device according to the present invention with the configuration above, a user can use such an advanced function of a client device even in the case where a server device is inferior to a client device in functionality and the client device obtains GUI data from the server device to use a content item stored in the server device.

It is also possible that, when the GUI program receives an instruction to use the difference function, the client function unit converts the content item obtained from the server device into data depending on the difference function and the display unit displays the converted video data in the GUI content.

Furthermore, the client device may include an instruction storage unit in which a called function is stored and an argument estimation unit configured to estimate an argument required for calling the difference function, wherein the argument estimation unit is configured to estimate the argument required for calling the difference function from the information stored in the capability storage unit and information stored in the instruction storage unit, and the difference function is called based on a result of the estimation of the argument estimation unit.

The present invention may be implemented not only as such a client device but also as an integrated circuit, a method of processing operations of the client device, or a program which causes the client device to perform the processing operations, or a recording medium in which the program is stored.

Advantageous Effects of Invention

A server device according to the present invention provides an advantageous effect of providing an older-generation server with a new function which the server device, which is of a newer generation, includes.

BRIEF DESCRIPTION OF DRAWINGS

FIG. 4 shows the setting information table of the server device according to Embodiment 1 of the present invention.

FIG. 5 shows a conflict information table of the server device according to Embodiment 1 of the present invention.

FIG. 6 shows a function information table of the server device according to Embodiment 1 of the present invention.

FIG. 8B is a flowchart which shows detailed operations of Steps S611 to S614 in FIG. 7 according to Embodiment 1 of the present invention.

FIG. 9 shows an exemplary file which the server device transmits to the client device according to Embodiment 1 of the present invention.

FIG. 10 shows another exemplary file which the server device transmits to the client device according to Embodiment 1 of the present invention.

DESCRIPTION OF EMBODIMENTS

Server devices and client devices according to embodiments of the present invention will be described below with reference to drawings.

Embodiment 1

A server device according to Embodiment 1 is connected to, for example, an old-generation client device and has more functions than the client device.

Figure 1:
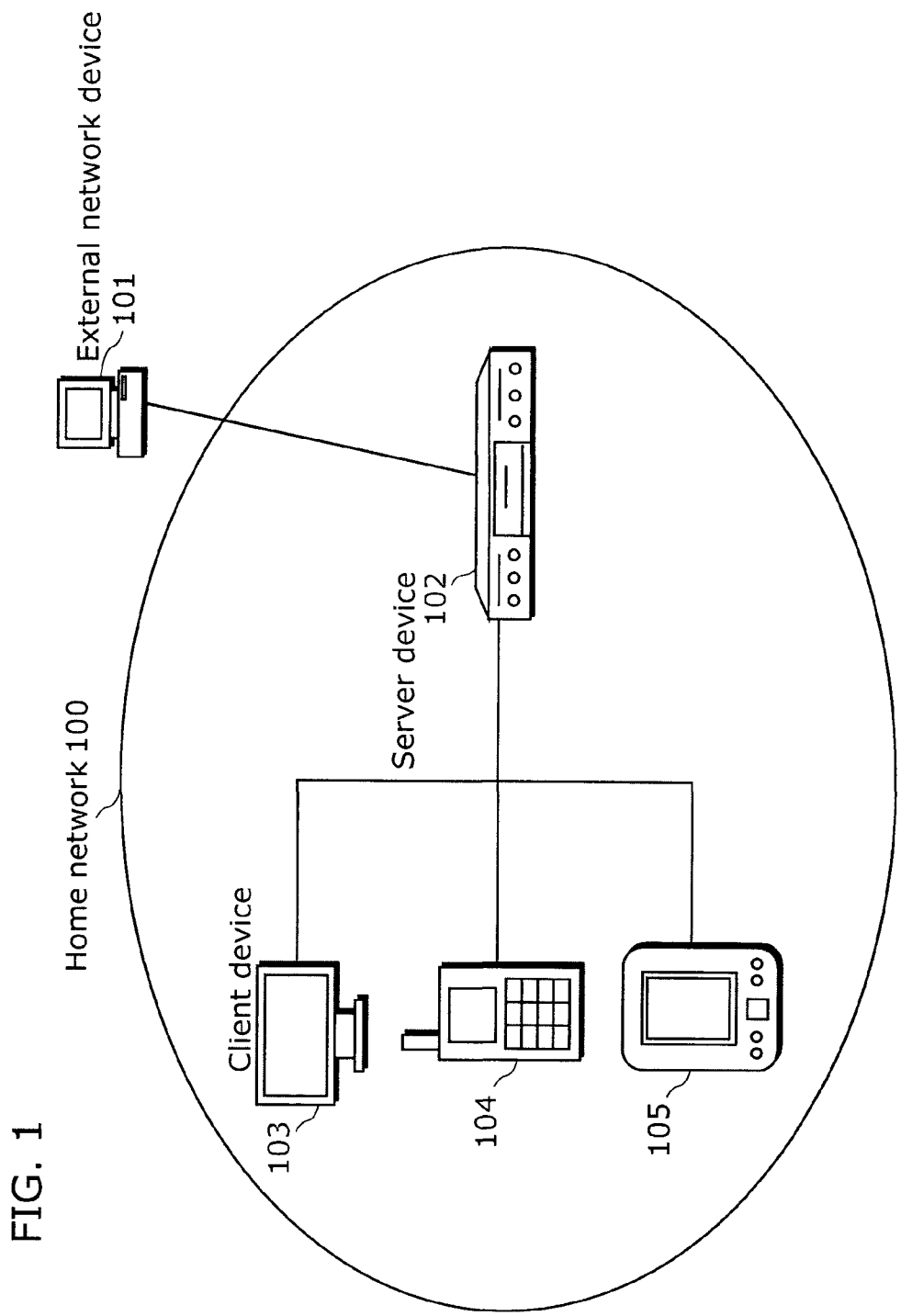
FIG. 1 is a configuration diagram of a home network including a server device according to Embodiment 1 of the present invention.

FIG. 1 is a configuration diagram of a home network including a server device according to Embodiment 1.

A home network 100 is constructed of a wired network or a wireless network such as Bluetooth and includes a server device 102 according to the present invention and remote devices 103 to 105 which are client devices connected to the server device 102. The remote devices 103 to 105 may be devices such as a TV, a DVD recorder, a Blu-Ray recorder, a mobile phone, or a digital camera. An external network device 101 is a device which is outside the home network 100 and has a network capability, and connected to the server device 102. The remote devices 103 to 105, which are included in the home network 100 and directly connected to the server device 102, may be connected to the server device 102 via the external network device 101. The remote devices 103 to 105 may be included in an external network. In the present invention, the server device 102 and the remote devices 103 to 105 may be provided at any place as long as the devices can communicate with each other.

In Embodiment 1, the server device 102 present on the home network 100 connects to the remote devices 103 to 105 and provides the remote devices 103 to 105 with processing using a function which the remote devices 103 to 105 lack, so that a function equivalent to a function of the server device 102 is made available on the remote devices 103 to 105. In the present invention, a function is implemented using at least one of hardware and software so that a desired processing is performed.

The remote devices 103 to 105 share equivalent functions and perform equivalent processing for the server device 102. The remote device 103 among the remote devices 103 to 105 will be treated as a client device 103 below in order to describe configurations and processing operations of the client device 103 and a server device 102.

Characteristics of the server device 102 according to Embodiment 1 are described with reference to FIG. 2.

Figure 2:
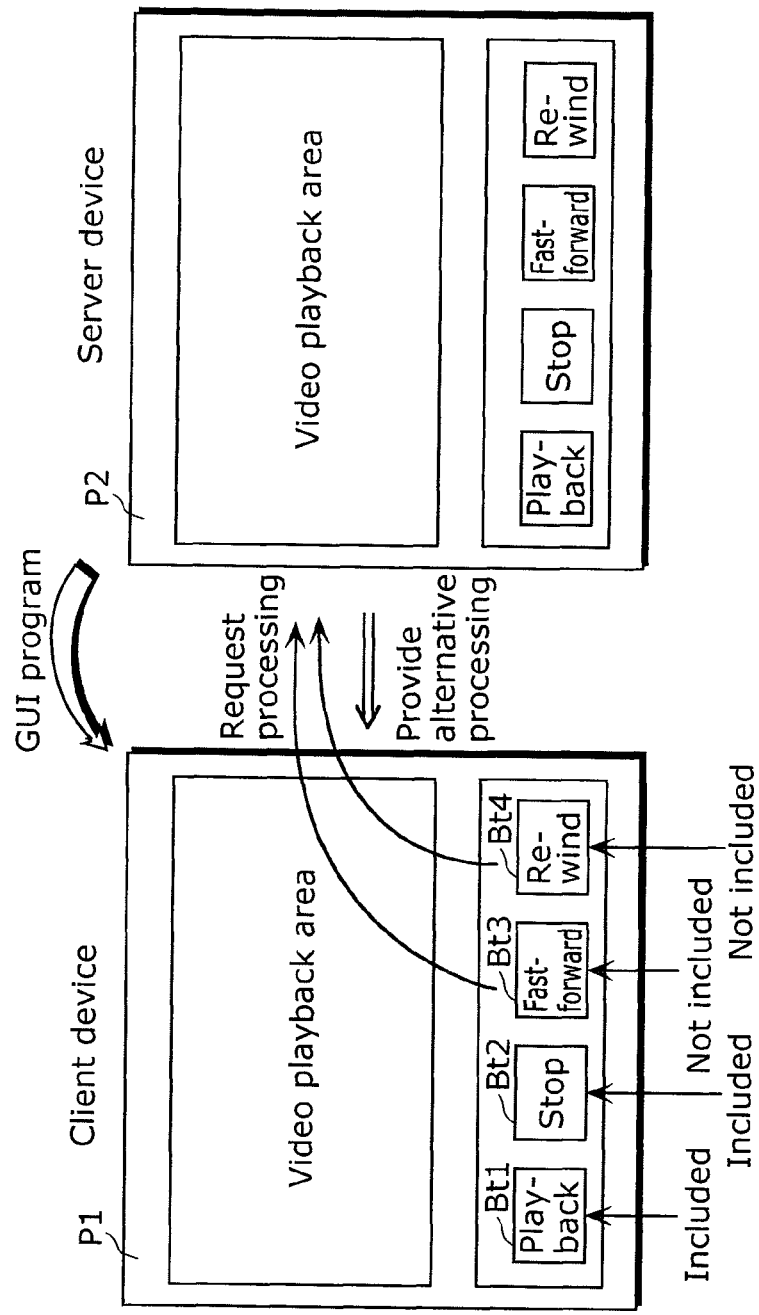
FIG. 2 shows screens displayed on a client device and the server device according to Embodiment 1 of the present invention.

FIG. 2 shows screens displayed on the client device 103 and the server device 102 according to Embodiment 1.

When the client device 103 requests a connection to the server device 102, the server device 102 transmits, to the client device 103, a GUI program for handling video content included in the client device 102. When executing the GUI program, the client device 103 generates and displays a playback operation screen P1, which is GUI content for accepting selection of functions equivalent to all the functions of the server device 102. The server device 102 also generates and displays a playback operation screen P2, which is GUI content for accepting selection of functions from all the functions of the server device 102. In Embodiment 1, the server device 102 thus makes the GUI content displayed on the client device 103 identical to the GUI content displayed on the server device 102.

The client device 103, which is an old-generation device in comparison with the server device 102, includes fewer functions for video content items than the server device 102. Specifically, the server device 102 includes functions of playback, stop, fast-forward, and rewind for video content items, but the client device 103 includes only functions of playback and stop.

Even in such a case, the client device 103 in Embodiment 1 generates and displays the playback operation screen P1 according to the GUI program so that the playback operation screen P1 includes not only buttons Bt1 and Bt2, which represents the functions which the client device 103 includes, playback and stop, but also buttons Bt3 and Bt4, which represents the functions which the client device 103 lacks, fast-forward and rewind.

The GUI program according to Embodiment 1 causes the client device 103 to perform the following steps: determining whether or not the client device includes the function selected by a user from among the functions represented in the playback operation screen P1; performing processing using the selected function when the client device 103 determines that the client device 103 includes the selected function; and requesting the server device 102 to perform processing using the selected function when the client device 103 determines that the client device does not include the selected function.

The client device 103 thus requests the server device 102 to perform processing using the function of fast-forward or rewind when a user selects the button Bt3, which represents fast-forward, or the button Bt4, which represents rewind, by GUI operation. When receiving the request for the processing using the function of fast-forward or rewind, the server device 102 provides the client device 103 with processing which is an alternative to the requested processing (hereinafter referred to as alternative processing). Specifically, the server device 102 performs the alternative processing to generate, for example, transmit data in which frames of video content have been thinned out (fast-forward data described below) as a result of the alternative processing for fast-forward. The server device 102 then transmits the transmit data to the client device 103.

Even when there is a difference in functionality between the server device 102 and the client device 103, the server device 102 according to Embodiment 1 thus causes the client device 103 to display GUI content identical to the GUI content displayed on the server device 102, and allows the client device 103 to virtually perform functions equivalent to those of the server device 102, absorbing the difference. Furthermore, existing trouble of customization of a GUI program (or GUI content) is saved because the server device 102 may provide the same GUI program for the client device 103 of a generation older than the server device 102.

Figure 3:
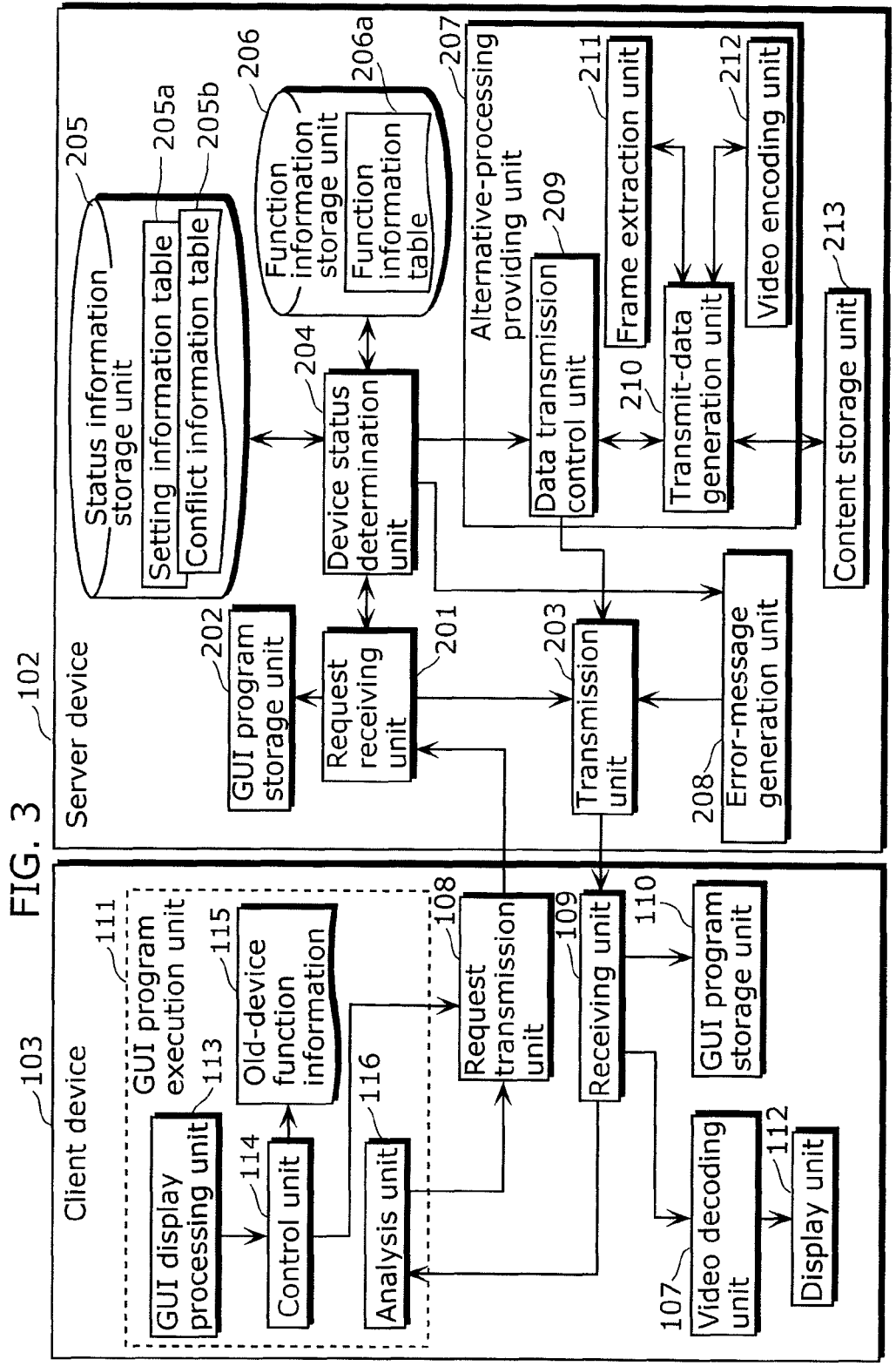
FIG. 3 is a block diagram of the client device and the server device according to Embodiment 1 of the present invention.

FIG. 3 is a block diagram of the client device 103 and the server device 102 according to Embodiment 1.

The client device 103 includes a GUI program execution unit 111, a request transmission unit 108, a receiving unit 109, a video decoding unit 107, a GUI program storage unit 110, and a display unit 112.

The request transmission unit 108 transmits a request for connection to the server device 102. The receiving unit 109 receives a result of processing by the server device 102 and the GUI program. The GUI program storage unit 110 stores the GUI program obtained from the server device 102. The video decoding unit 107 decodes a video content item (for example, the fast-forward data) received from the server device 102. The display unit 112 displays images of the video content item decoded by the video decoding unit 107. The GUI program execution unit 111 executes the GUI program which the client device has received from the server device 102 and the GUI program storage unit 110 stores. The GUI program execution unit 111 includes a GUI display processing unit 113, a control unit 114, and an analysis unit 116. The GUI display processing unit 113 generates the GUI content such as the playback operation screen and causes the display unit 112 to display it. The control unit 114 controls instructions generated in the GUI operation with reference to old-device function information 115 which is stored in the GUI program storage unit 110 and lists functions of the old device (the client device 103). The analysis unit 116 analyzes files which the receiving unit 109 has received from the server device 102.

The server device 102 includes a request receiving unit 201, a GUI program storage unit 202, a status information storage unit 205, a device status determination unit 204, a function information storage unit 206, a transmission unit 203, an alternative-processing providing unit 207, an error-message generation unit 208, and a content storage unit 213.

When receiving a request for connection from the request transmission unit 108 of the client device 103, the request receiving unit 201 obtains from the GUI program storage unit 202 the GUI program for making a GUI, and then transmits the GUI program to the client device 103 via the transmission unit 203. The request receiving unit 201 also receives a request for alternative processing provided for the server device 102 by the client device 103 using the GUI. The GUI program storage unit 202 stores the GUI program for making the GUI. The GUI program includes information for listing video content items stored in the server device 102, a controlling mechanism which controls instructions generated in GUI operations, a function for analyzing an XML file, and the old-device function information 115. The transmission unit 203 transmits the GUI program and the result of the processing by the server device 102 to the client device 103.

The device status determination unit 204 obtains a setting information table 205a, a conflict information table 205b, and a function information table 206a, which are present in the server device 102. The device status determination unit 204 then determines, with reference to the tables 205a, 205b, and 206a, whether or not the processing (alternative processing) requested by the client device 103 can be performed in the server device 102. When determining that alternative processing can be performed there, the device status determination unit 204 requests the alternative-processing providing unit 207 to perform the alternative processing. In Embodiment 1, the device status determination unit 204 serves not only as a status determination unit which determines, depending on a status of the server device 102 indicated by the setting information table 205a and the conflict information table 205b, whether or not processing requested by the client device 103 can be performed but also as an alternative-processing specifying unit which specifies alternative processing with reference to the function information table 206a. In other words, the device status determination unit 204 includes the status determination unit and the alternative-processing specifying unit.

The status information storage unit 205 has the setting information table 205a and the conflict information table 205b. The setting information table 205a indicates whether or not settings of the server device 102 are sufficient. The conflict information table 205b indicates information on functions which the server device 102 includes. The setting information table 205a and the conflict information table 205b are collectively referred to as status information tables. The function information storage unit 206 has the function information table 206a in which each of the functions of the server device 102 is associated with a function which is an alternative to the function.

The alternative-processing providing unit 207 provides alternative processing in response to a request by the client device 103, which is of the older generation, when there is a difference between the client device 103 the older-generation and the server device 102 of the newer generation in functionality or when, more specifically, the device status determination unit 204 determines that alternative processing can be performed.

The alternative-processing providing unit 207 includes a data transmission control unit 209, a transmit-data generation unit 210, a frame extraction unit 211, and a video encoding unit 212. The data transmission control unit 209 receives the request by the device status determination unit 204 for alternative processing, and then instructs the transmit-data generation unit 210 to generate transmit data which is a result of the alternative processing. The data transmission control unit 209 further transmits the transmit data which is the result of the alternative processing to the client device 103 via the transmission unit 203.

The transmit-data generation unit 210 takes out a video content item from the content storage unit 213 when receiving the instruction to generate the transmit data from the data transmission control unit 209. The transmit-data generation unit 210 then issues instructions for the video content item, such as an encode instruction and frame-extraction instruction, to the frame extraction unit 211 or the video encoding unit 212. The frame-extraction instruction is an instruction which causes extraction of frame necessary for the alternative processing. The content storage unit 213, which may be a hard disk, stores video content available on the server device 102. The frame extraction unit 211 obtains the video content item from the content storage unit 213 through the transmit-data generation unit 210, and extracts the necessary frames from the video content item according to the frame-extraction instruction issued by the transmit-data generation unit 210. The video encoding unit 212, according to the encode instruction issued by the transmit-data generation unit 210, encodes a group of frames extracted by the frame extraction unit 211. The transmit data which is the result of the alternative processing is generated through such encoding. The transmit data thus generated is the fast-forward data.

The error-message generation unit 208 receives, from the device status determination unit 204, error-determination information which is a result of the determination by the device status determination unit 204 and shows an error occurring in the server device 102. The error-message generation unit 208 then generates an error message using the error-determination information to provide it for the client device 103. The error-message generation unit 208 may notifies the client device 103 of the error through the transmission unit 203 by, for example, sending the error message as a direct text message to the client device 103 or notifying the client device 103 of a location of a program to display the error message.

FIG. 4 shows the setting information table 205a of the server device 102.

The setting information table 205a indicates, by setting statuses, whether or not settings, such as settings for connection or communication, are currently adequate, as shown in lines g1 to g3. For example, the line g1 of the setting information table 205a indicates that the setting for registration of devices connected to the server device 102 is adequate (Registration of connected devices: OK). The line g2 indicates that the setting for the maximum number of devices connected to the server device 102 is inadequate (Maximum connected devices: N/A). The line g3 indicates that the setting for connection speed of the server device 102 is adequate (Communication speed: OK). Although the setting information table 205a in FIG. 4 indicates setting statuses of the three settings, they are merely examples. Settings may differ from device to device and is not limited to them. Whenever the setting statuses of the server device 102 are changed, the setting information table 205a is updated to reflect the change in the setting statuses.

FIG. 5 shows the conflict information table 205b of the server device 102.

The conflict information table 205b indicates, for each of the functions of the server device 102, the name of the function (function name) and whether or not the function is currently available on the basis of conflict with the other functions as shown in lines g11 to g19. For example, the line g11 of the conflict information table 205b indicates that the function with a function name of "fastforward" (fast-forward) is currently available (OK) without conflict with the other functions. The line g13 indicates that the function with a function name of "record" (record) is currently not available (N/A) because of conflict with another function. Whenever there is a change of the functions of the server device 102 in availability, the conflict information table 205b is updated to reflect a result of the change.

FIG. 6 shows the function information table 206a of the server device 102.

The function information table 206a indicates, for each of the functions of the server device 102, the function name, an alternative processing name which is the name of the processing alternative to the processing using the function (alternative processing), and an alternative processing URL which is an access of the program for performing the alternative processing as shown in lines g21 to g28. For example, the line g22 of the function information table 206a indicates the following: the function name of the function of fast-forward which the server device 102 includes, "fastForward"; the alternative processing name to the fast-forward, "altFastForward"; and the alternative processing URL which is the access of the program for performing the alternative processing with the alternative processing name, "http://A/BBB.cgi?/function=altFastForward". The function information table 206a also indicates information on alternative processing to functions of fast-forward, rewind, rotation, zoom-in, zoom-out, double-speed playback, and triple-speed playback. The function information table 206a may indicate not only the function names, the alternative processing names, and the alternative processing URLs for the alternative processing shown in FIG. 6 but also those of the other functions not shown there.

Figure 7:
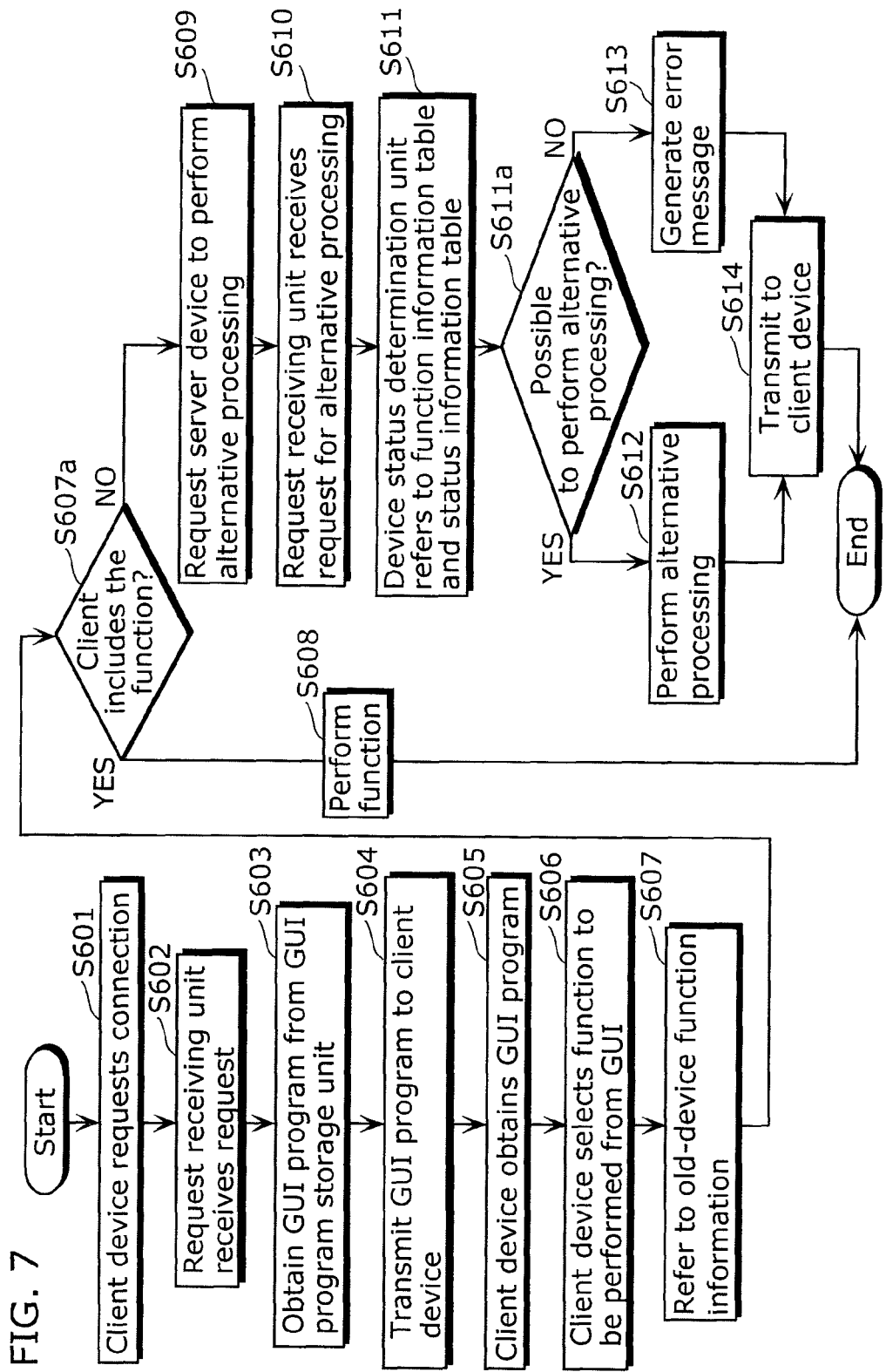
FIG. 7 is a flowchart which shows overall operations of the server device and the client device according to Embodiment 1 of the present invention.

FIG. 7 is a flowchart which shows overall operations of the server device 102 and the client device 103 according to Embodiment 1.

First, the request transmission unit 108 of the client device 103 requests the server device 103 to provide the GUI program for making the GUI to be used for operating the server device 102 (Step S601). The request receiving unit 201 of the server device 102 receives the request (the request for the GUI program) (Step S602), and then obtains the GUI program from the GUI program storage unit 202 in response to the request (Step S603). The request receiving unit 201 of the server device 102 then transmits the obtained GUI program to the client device 103 through the transmission unit 203 (Step S604). When receiving the GUI program, the receiving unit 109 of the client device 103 stores the GUI program in the GUI program storage unit 110 (Step S605). The GUI program execution unit 111 of the client device 103 executes the GUI program in order to receive selection of a function (for example, fast-forward) by a user using the GUI (the playback operation screen P1) (Step S606).

The control unit 114 of the client device 103 then refers to the old-device function information 115 (Step S607) and determines whether or not the client device 103 includes the selected function (for example, playback, fast-forward) on the basis of a result of the reference (Step S607a). When determining that the client device 103 includes the function (YES in Step S607a), the control unit 114 performs processing depending on the function (Step S608). For example, when the selected function is playback and the function of playback is indicated in the old-device function information 115, the control unit 114 requests the server device 102 to provide a video content item, causes the video decoding unit 107 to decode the video content item, and causes the display unit 112 to display the video content.

On the other hand, when determining that the client device 103 lacks the function (NO in Step S607a), the control unit 114 of the client device 103 instructs the request transmission unit 108 to request the server device 102 to perform processing using the function which the client device 103 lacks, that is, alternative processing (Step S609). When the request receiving unit 201 of the server device 102 receives the request (request for alternative processing) (Step S610), the device status determination unit 204 refers to the status information tables which includes the setting information table 205a and the conflict information table 205b, and the function information table 206a (Step S611). The device status determination unit 204 then determines, on the basis of a result of the reference, whether or not the alternative processing can be provided (Step S611a).

When determining that the alternative processing can be provided (YES in Step S611a), the device status determination unit 204 causes the alternative-processing providing unit 207 to perform the alternative processing (Step S612). The alternative-processing providing unit 207 performs the alternative processing, and then transmits a result of the alternative processing to the client device 103 through the transmission unit 203 (Step S614). On the other hand, when determining that the alternative processing cannot be provided (NO in Step S611a), the device status determination unit 204 causes the error-message generation unit 208 to generate an error message (Step S613). The error-message generation unit 208 generates the error message, and then transmits the error message to the client device 103 via the transmission unit 203 (Step S614).

Figure 8A:
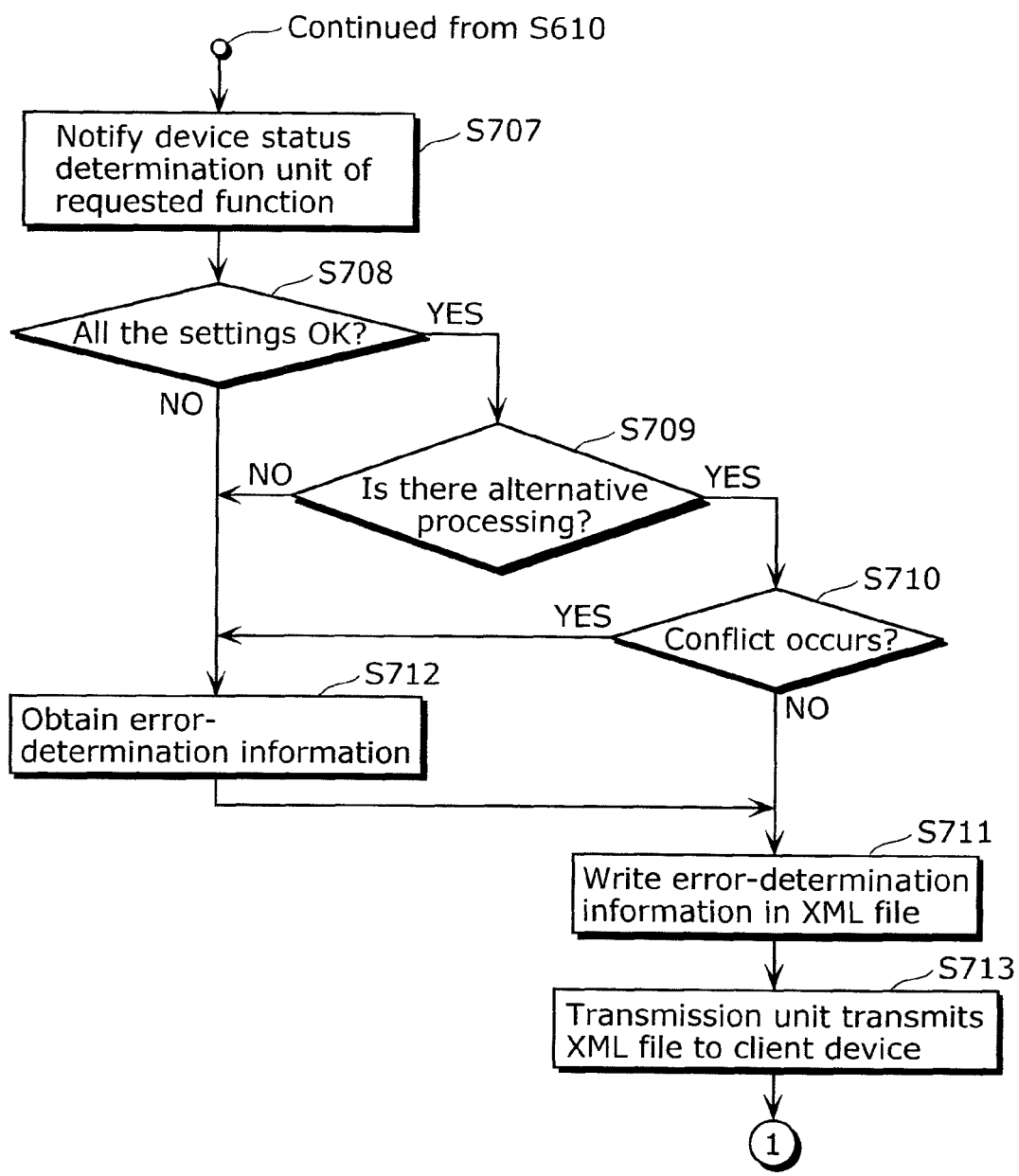
FIG. 8A is a flowchart which shows detailed operations of Steps S611 to S614 in FIG. 7 according to Embodiment 1 of the present invention.

FIG. 8A and FIG. 8B are flowcharts which show detailed operations of Steps S611 to S614 shown in FIG. 7.

For the operations shown in FIG. 8A and FIG. 8B, it is assumed that the GUI program for making the GUI has been downloaded to the client device 103 and stored therein, and that the video content item is being played on the client device 103. Each of such video content items is associated with a content item name. For example, when a user selects a specific video content item, the GUI internally obtains information (the content item name) which indicates the selected item. The request for playback is made using a play function, "play(http://hostname/program.cgi?contentname=aaa.mpg)", which indicates the function of "playback". The operations shown in FIG. 8A and FIG. 8B are operations performed when the client device 103 requests the server device 102 to perform alternative processing for fast-forward of the video content item which is being played on the client device 103. Although FIG. 8A and FIG. 8B shows as an example operations for alternative processing for fast-forward, alternative processing may be performed not only for fast-forward but also for other functions such as rewind.

When receiving the request for alternative processing which indicates a function (the function name) which the client device 103 lacks (Step S610), the request receiving unit 201 of the server device 102 analyzes the request for alternative processing and notifies the device status determination unit 204 of the requested function (Step S707). The device status determination unit 204 then refers to all the lines of the setting information table 205 stored in the status information storage unit 205 in order to determine whether or not all the settings are adequate (Step S708). Specifically, the device status determination unit 204 determines whether or not that setting statuses of all the settings are "OK". When determining that all the settings are adequate (YES in Step S708), the device status determination unit 204 determines whether or not there is alternative processing for the requested function with reference to the function information table 206a (Step S709). For example, when the request for alternative processing indicates the function name of fast-forward, "fastForward", the device status determination unit 204 determines that there is alternative processing for fast-forward because the function information table 206a has an alternative processing name, "altFastForward", and an alternative processing URL, "http://A/BBB.cgi?/function=altFastForward", in the second column of the line g22. Furthermore, the device status determination unit 204 then obtains the alternative processing name in the third column of the line g22 of the function information table 206.

When determining that there is alternative processing for the requested function (YES of Step S709), the device status determination unit 204 determines whether or not the function indicated in the request for alternative processing is currently available with reference to the conflict information table 205b stored in the status information storage unit 205 (Step S710). Specifically, the device status determination unit 204 determines whether or not the function indicated in the request for alternative processing becomes unavailable because of a conflict with another function caused by using the function indicated in the request for alternative processing. When determining that the function is available with no conflict (NO in Step S710), the device status determination unit 204 writes the results of the determinations in Steps S708 to S710 and the URL for the alternative processing in a file (in XML format) (Step S711), and then transmits the file to the receiving unit 109 of the client device 103 via the request receiving unit 201 and the transmission unit 203.

The device status determination unit 204 obtains error-determination information (Step S712) when determining that any of the settings is inadequate in Step S708 (NO in Step S708), when determining that there is no alternative processing for the requested function in Step S709 (NO in Step S709), or when determining that a conflict is caused and the function is unavailable (YES in Step S710). The device status determination unit 204 then writes the error-determination information and an error-handling URL in a file (in XML format) (Step S711). The device status determination unit 204 transmits the file to the receiving unit 109 of the client device 103 through the request receiving unit 201 and the transmission unit 203 (Step S713).

FIG. 9 shows an exemplary file which the server device 102 transmits to the client device 103.

A file f1 is the file generated when the device status determination unit 204 determines in Step S710 that the function is available with no conflict (NO in Step S710). The file f1 is written in Extensible Markup Language (XML). The file f1 includes an element starting with a tag of <result>. The element <result> contains elements of <setting>, <alternative>, <competition>, and <url>. The element <setting> indicates the result of the determination in Step S708, that is, the status of the setting. The element <alternative> indicates the result of the determination in Step S709, that is, whether or not there is alternative processing. The element <competition> indicates the result of the determination in Step S710, that is, whether or not a conflict occurs. The element <url> indicates URL information including the alternative processing URL obtained in Step S709. This information indicates the URL for access to the program for the alternative processing (alternative-processing program) for fast-forward.

The server device 102 refers to the setting information table 205a first, and then the function information table 206a and the conflict information table 205b in order in Steps S708 to S710 in order to avoid redundant reference processes. For example, referring to the function information table 206a is in vain when the server device 102 refers to the function information table 206a and the conflict information table 205b first and determines that alternative processing can be performed but settings finally turn out to be inadequate, which is indicated by the setting information table 205a.

Although the device status determination unit 204 in Embodiment 1 uses the XML format to notifies the client device 103 of the URL for alternative processing and the results of the determinations with reference to the status information storage unit 205 and the function information storage unit 206, such notification may be made by any method. For example, such notification may be made using a text file, a program, or binary data. Even when the client device 103 lacks a function of checking its own functions, the request receiving unit 201 may determine capability of the client device 103 by analyzing an HTTP header of the request which the request receiving unit 201 has received from the client device 103 to obtain an User-Agent; thus the client device 103 can be still notified of the alternative processing URL and the results of the determinations when the alternative processing URL is obtained from the function information table 206a depending on the determined capability.

As shown in FIG. 8B, the receiving unit 109 of the client device 103 receives the file from the server device 102 (Step S714), and then the analysis unit 116 of the client device 103 analyzes the element <result> in the file (Step S715). The processing operation will be described below which the analysis unit 116 performs in order to analyze the element <result> in the file f1 shown in FIG. 9.

The analysis unit 116 determines whether or not any element contained in the element <result> shows a problem, specifically, whether or not the file f1 indicates an error (Step S716). For example, the analysis unit 116 determines that all the elements contain no problem when the element <setting> contains "OK" which indicates that all the settings are adequate, the element <alternative> contains "YES", which indicates that there is alternative processing for the requested function, and the element <competition> contains "NO", which indicates that no conflict occurs and a function is available.

When determining that no problem is shown there (NO in Step S716), the analysis unit 116 causes the request transmission unit 108 to access the URL information in the element <url>, "http://hostName/BBB.cgi?status=normal&function=altFastForward" (Step S717). For example, the request transmission unit 108 thus transmits an access request having a structure of play(url information) such as "play(http://hostname/BBB.cgi?status=normal&function=altFastForward)".

The request receiving unit 201 of the server device 102 receives the access request (Step S719), and then performs a string operation to take out the following program name and information from the URL information in the access request: the name of the alternative-processing program to be executed, "BBB.cgi"; status information, "status=normal"; and function information, "function=altFastForward". The request receiving unit 201 then notifies the device status determination unit 204 of the program name, the status information, and the function information. The device status determination unit 204 checks the status information (Step S720) to determine whether or not the status information indicates normal, that is, whether or not the status information indicates an error (Step S721). In this example, the status information is "status=normal". The device status determination unit 204 thus determines that it indicates normal, in other words, the server device 102 has no problem (NO in Step S721), so that the device status determination unit 204 requests the data transmission control unit 209 of the alternative-processing providing unit 207 to execute the alternative-processing program with the program name "BBB.cgi" and provides the data transmission control unit 209 with a notification of the function information.

When receiving the request and the notification, the data transmission control unit 209 starts the alternative-processing program with the program name "BBB.cgi", and requests the transmit-data generation unit 210 to generate transmit data. The transmit-data generation unit 210 then obtains a video content item from the content storage unit 213 (Step S722), and generates fast-forward data which is the transmit data by causing the frame extraction unit 705 to extract frames to be transmitted to the client device 103 from the video content item (Step S723).

Here, in order to generate the fast-forward data, the frame extraction unit 705 decodes the video content and extracts only I frames and P frames of the decoded video content item. When the function information is "function=altRewind", that is, when the function information indicates alternative processing for rewind, the frame extraction unit 705 performs processing inverse to the processing of fast-forward, extracting I frames and P frames prior to the time when the request for alternative processing for rewind is received. In the case where function information indicates alternative processing for other functions (for example, double-speed playback), the frame extraction unit 705 starts extracting adequate frames in a similar way at the time when receiving a request for alternative processing. The video encoding unit 212 subsequently generates fast-forward data by re-encoding the extracted frames (Step S724), and then transmits the fast-forward data in series to the receiving unit 109 of the client device 103 via the transmit-data generation unit 210, the data transmission control unit 209, and the transmission unit 203 (Step S727).

The receiving unit 109 of the client device 103 receives a result of the processing performed by the server device 102 (Step S728), and then determines whether or not the result of the processing indicates an error (Step S728a). In this example, the receiving unit 109 receives the fast-forward data, which is the result of the processing on the video content item; thus determining that the result of the processing does not indicate an error. When determining that the result of the processing does not indicate an error (NO in Step S728a), the receiving unit 109 provides the fast-forward data for the video decoding unit 107 and causes the video decoding unit 107 to decode the fast-forward data (Step S729). The video decoding unit 107 then causes the display unit 112 to display the decoded fast-forward data in series (Step S731). The fast-forward data is thus reproduced.

The fast-forward data is reproduced to provide images which are apparent equivalent to fast-forwarded images of the video content item. The client device 103 thus performs a function equivalent to fast-forward playback of the video content item by simply reproducing the fast-forward data. For the present invention, any protocols and methods are applicable which are among various protocols and methods available for transmission of the data, such as the fast-forward data, from the server device 102 to the client device 103, encode of the data, decode of the data by the video decoding unit 107 of the client device 103.

A case will be described below where no alternative processing is available.

FIG. 10 shows another exemplary file which the server device 102 transmits to the client device 103.

A file f2 is the file generated when the device status determination unit 204 determines in Step S710 shown in FIG. 8A that an occurrence of a conflict makes the function unavailable (YES in Step S710). The file f2 is written in XML. As in the case of the file f1, the file f2 includes an element starting with a tag of <result>. The element <result> contains elements of <setting>, <alternative>, <competition>, and <url>. The element <setting> indicates the result of the determination in Step S708, that is, the status of the setting. The element <alternative> indicates the result of the determination in Step S709, that is, whether or not there is alternative processing. The element <competition> indicates the result of the determination in Step S710, that is, whether or not a conflict occurs. The element <url> indicates information including the error-handling URL. This information indicates the URL for access to a program for error handling (error-handling program).

As shown in FIG. 8B, the receiving unit 109 of the client device 103 receives the file f2 from the server device 102 (Step S714), and then the analysis unit 116 analyzes the element <result> in the file f2 (Step S715). The analysis unit 116 thus determines whether or not any element contained in the element <result> shows a problem, specifically, whether or not the file f2 indicates an error (Step S716). For example, the analysis unit 116 determines that an element contains a problem when the element <competition> contains "YES", which indicates that a function is unavailable because of a conflict.

When determining that a problem is shown there (YES in Step S716), the analysis unit 116 causes the request transmission unit 108 to access the URL information in the element <url>, "http://hostName/error.cgi?status=abnormal&function=altFastForward" (Step S718). For example, the request transmission unit 108 thus transmits an access request having a structure of play(url information) such as "play(http://hostName/error.cgi?status=abnormal&function=altFastForwar d&competition=yes)".

The request receiving unit 201 of the server device 102 receives the access request (Step S719), and then performs a string operation to take out the following program name and information from the URL information in the access request: the name of the error-handling program to be executed, "error.cgi"; status information, "status=abnormal"; function information, "function=altFastForward"; and error information, "competition=yes". The request receiving unit 201 then notifies the device status determination unit 204 of the program name, the status information, and the function information. The device status determination unit 204 checks the status information (Step S720) to determine whether or not the status information indicates normal, that is, whether or not the status information indicates an error (Step S721). In this example, the status information is "status=abnormal". The device status determination unit 204 thus determines that it does not indicate normal, in other words, an error (YES in Step S721), so that the device status determination unit 204 provides the error-message generation unit 208 of a notification of the error information "competition=yes" (Step S725). In other words, since the error information indicates that a conflict occurs, the device status determination unit 204 notifies the error-message generation unit 208 of the occurrence of the conflict. When receiving the notification of the error information, the error-message generation unit 208 starts the error-handling program with the program name "error.cgi", generates a program for error indication to cause the client device 103 to display an error message (Step S726), and transmits the program to the client device 103 through the transmission unit 203 (Step S727).

The receiving unit 109 of the client device 103 receives a result of the processing performed by the server device 102 (Step S728), and then determines whether or not the result of the processing indicates an error (Step S728a). In this example, the receiving unit 109 receives the program for error indication, which is the result of the processing on the error information; thus determining that the result of the processing indicates an error. When determining that the result of the processing indicates an error (YES in Step S728a), the receiving unit 109 executes the program for error indication (Step S730) and causes the display unit 112 to display the error message (Step S731). This allows the user of the client device 103 to know an error which has occurred in the server device 102.

This is a method which eliminates the need for changing an error handling operation using a GUI and an error GUI depending on generations of the devices, thus providing an advantage of allowing the server device 102 to divert the aforementioned system even when the server device 102 is connected to the old-generation client device 103.

In Embodiment 1, the error message is delivered to the user by transmitting the program for error indication which shows the user the error message in the GUI. However, any method that can show the user the message may be employed. For example, the message may be delivered to the client device 103 as a text string and displayed in a window on the client device 103.

In Embodiment 1, first the client device 103 is notified of the access to the alternative-processing program or the error-handling program using the XML file, and then the program is accessed when the client device 103 makes a request for access to the program. In other words, the server device 102 once returns the processing to the client device 103. However, advantageous effects of the present invention may be achieved without doing this. Specifically, the device status determination unit 204 may directly access the alternative-processing program by obtaining the alternative-processing URL from the function information table 206a using the function name of the requested function, "fastForward".

However, returning the processing to the client device 103 using an XML file or the like has an advantage. The server device 102 is required to securely process requests made by a plurality of the client devices 103 even when the server device 102, unlike a personal computer (PC), is not provided with a high-performance central processing unit (CPU) or a large memory. Thus, in such a case where the server device 102 is under high load, alternative processing or providing of error messages is preferably delayed. In Embodiment 1, the server device 102 thus employs the method, in which the server device uses the XML file or the like, in order to temporarily returning the processing to the client device 103. The advantage is that the server device 102 may take control of the client device 103 at its own convenience. When transmitting the XML file to the client device 103, the server device 102 may provide the client device 103 with information which allows the client device 103 to access the alternative processing URL when the server device 102 is available or a predetermined condition is satisfied.

According to the Embodiment 1, the server device 102 thus provides the client device 103 with processing using a function which the client device 103 lacks as alternative processing. This provides an advantageous effect that the server device 102 may transmit a GUI program (GUI content) without customizing it in accordance with capability of the client device 103; thus allowing the client device 103 to display the GUI content equivalent to that of the server device 102 and making functions equivalent to those of the newer-generation server device 102 even on the server device 103 which is of an older generation and inferior in capability.

Furthermore, in Embodiment 1, determinations are made using information tables such as the status information table, so that the client device 103 may securely receive response from the server device 102 without substantial delay or stop of processing even when there is a change in statuses of the server device 102 such as a setting status of connection and disconnection with other devices and conflict between functions included in the server device 102. Such determinations are effective especially in the case where plurality of devices requests the server device 102 which is inferior to a PC server in memory capacity or CPU processing capacity to use the same function at the same time or in the case where settings are often changed.

(Variation 1)

A server device according to Variation 1 of the Embodiment 1 will be described below with reference to drawings. A server device according to Variation 1 provides a client device not with the alternative processing for functions for a video content item, such as fast-forward as in Embodiment 1, but with alternative processing for functions for a still-image content item, such as rotation. Specifically, the server device according to Variation 1 provides the client device with alternative processing for functions such as rotation, enlargement, reduction, and effect for a still-image content item when a user views the still-image content item stored in the server device on the client device.

Figure 11:
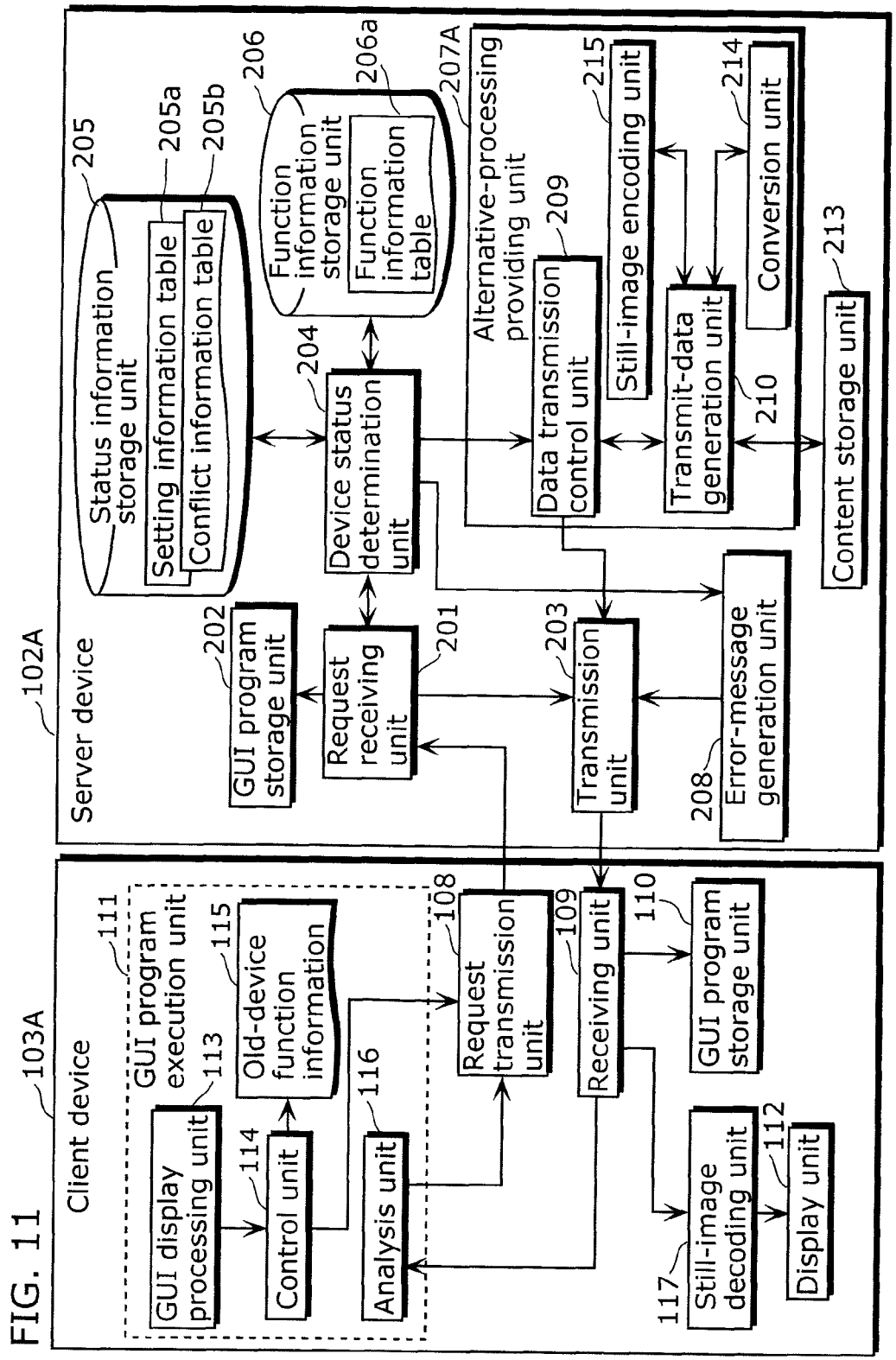
FIG. 11 is a configuration diagram of a server device and a client device according to Variation 1 of Embodiment 1 of the present invention.

FIG. 11 is a configuration diagram of a server device and a client device according to Variation 1.

A client device 103A according to Variation 1 includes the GUI program execution unit 111, the request transmission unit 108, the receiving unit 109, a still-image decoding unit 117, the GUI program storage unit 110, and a display unit 112. A server device 102A according to Variation 1 includes the request receiving unit 201, the GUI program storage unit 202, the status information storage unit 205, the device status determination unit 204, the function information storage unit 206, the transmission unit 203, an alternative-processing providing unit 207A, the error-message generation unit 208, and the content storage unit 213. The alternative-processing providing unit 207A includes the data transmission control unit 209, the transmit-data generation unit 210, a still-image encoding unit 215, and a conversion unit 214. In FIG. 11, components which have the same functions and configurations as those of the components shown in FIG. 3 according to Embodiment 1 are denoted with the same reference numerals as in Embodiment 1, thus a detailed description thereof is omitted. The content storage unit 213 stores still-image content items.

The conversion unit 214 of the alternative-processing providing unit 207 converts a still-image content item depending on a request by the client device 103 for editing, which is a request for alternative processing on the still-image content item. The still-image encoding unit 215 encodes the converted still-image content item. The still-image decoding unit 117 of the client device 103A decodes the encoded still-image content item which is a result of processing performed by the server device 102A to cause the display unit 112 display the decoded still-image content item.

Variation 1 is different from Embodiment 1 in that a still image is generated which is rotated, enlarged, reduced, or provided with a special effect using the conversion unit 214 of the server device 102, and that the generated still image is displayed on the client device 103.

Figure 12:
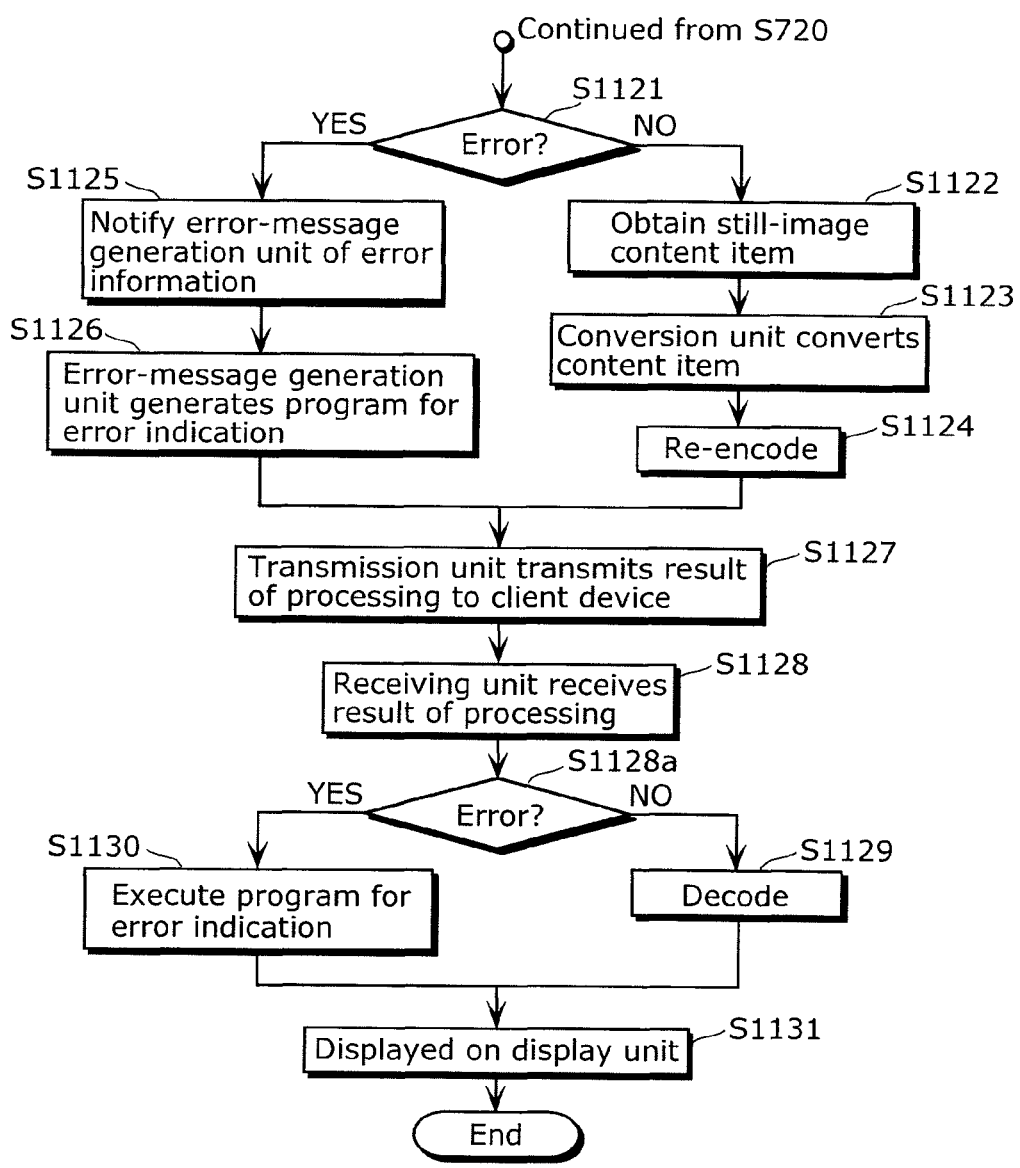
FIG. 12 is a flowchart which shows alternative processing and processing of displaying still-image content according to Variation 1 of Embodiment 1 of the present invention.

FIG. 12 is a flowchart which shows alternative processing and processing of displaying a still-image content item according to Variation 1. As in the case of Embodiment 1, it is assumed that the GUI program for making the GUI has been downloaded to the client device 103A, and that a user is viewing the still-image content item on the client device 103A. Although the server device 102A and the client device 103A perform the similar operations as in Embodiment 1 shown in FIG. 7, FIG. 8A, and FIG. 8B, the processing from Steps S721 to S731 shown in FIG. 8B are replaced by editing of a still-image content item, which is alternative processing, so that a still image of the edited still image data (transmit data) is displayed.

Specifically, the device status determination unit 204 checks status information received from the client device 103A to determine whether or not the status information indicates an error (Step S1121). When the device status determination unit 204 determines that the status information does not indicate an error (NO in Step S1121), the transmit-data generation unit 210 obtains a still-image content item from the content storage unit 213, transmits the obtained still-image content item to the conversion unit 214, and causes the conversion unit 214 to convert the still-image content item (Step S1123). The conversion unit 214 converts the encoded still-image content item by decoding it. The still-image encoding unit 215 re-encodes the converted still-image content item (Step S1124), and then transmits the converted and then encoded still image data item to the client device 103A via the transmission unit 203 (Step S1127).

The receiving unit 109 of the client device 103A receives a result of the processing by the server device 102A (Step S1128), and then determines whether or not the result of the processing indicates an error (Step S1128a). In this example, the receiving unit 109 receives the still-image data which is the result of the processing on the still-image content item; thus determining that the result of the processing does not indicate an error. When determining that the result of the processing does not indicate an error (NO in Step S1128a), the receiving unit 109 provides the still-image data for the still-image decoding unit 117 and causes the still-image decoding unit 117 to decode the still-image data (Step S1129). The still-image decoding unit 117 then causes the display unit 112 to display an image of the decoded still-image data (Step S1131).

Processing of Steps S1125, S1126, and S1130 shown in FIG. 12 is the same as the processing of Steps S725, S726, and S730 of Embodiment 1 shown in FIG. 8B.

Although the alternative processing in Embodiment 1 and Variation 1 is performed on a video and a still image, any processing, such as the one performed on sound, may be such alternative processing. For example, when a newer-generation server device and an older-generation client device are connected, and the new-generation server device including a function of providing various effects for a recorded audio content item (effect-providing function) but the older-generation client device lacks such a function, the server device provides the older-generation client device with processing using the effect-providing function.

(Variation 2)

Variation 2 of Embodiment 1 will be described below.

The server device 102 according to Variation 2 has a feature that the server device 102 transmits to the client device 103 a GUI program different from the GUI program in Embodiment 1. Specifically, when a specific condition is satisfied, the client device 103 executing a GUI program according to Variation 2 requests the server device 102 to perform processing using a function, such as a function of recording a video content item, even if the client device 103 includes the function. Although recording will be described below as the included function, other functions may be the function. When recording is the function, the client device 103 and the server device 102 are each capable of receiving a distributed video content item and recording it on a recording medium using the function.

Figure 13:
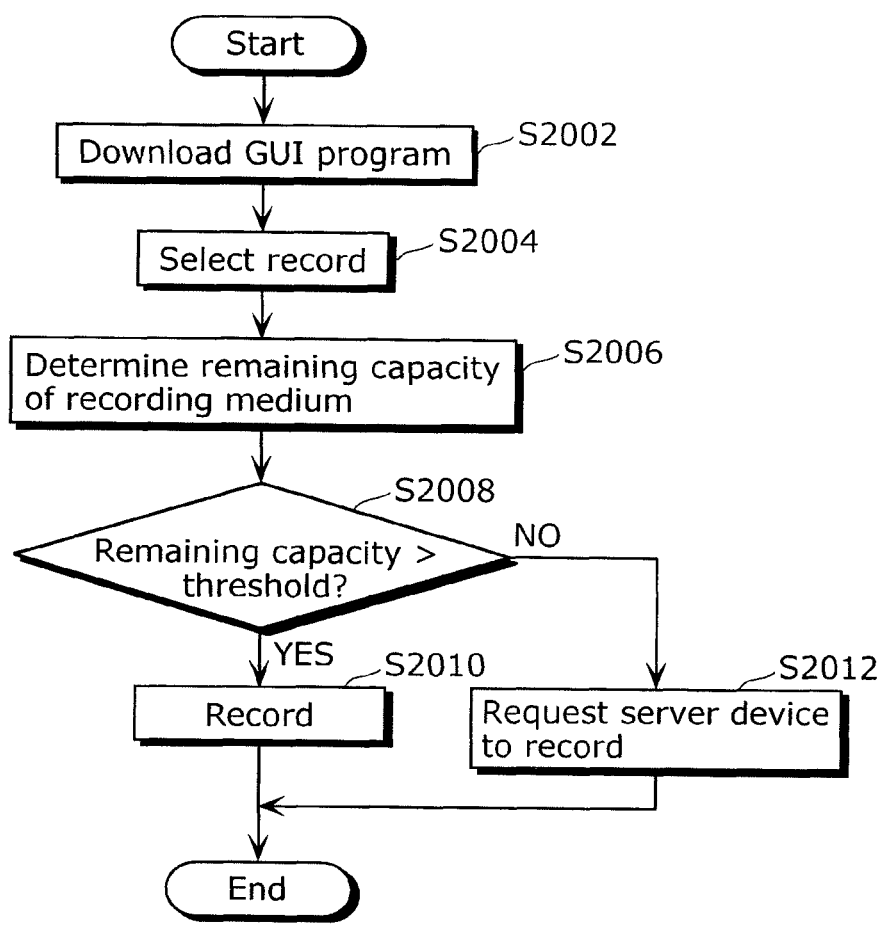
FIG. 13 is a flowchart which shows operations of a client device according to Variation 2 of Embodiment 1 of the present invention.

FIG. 13 is a flowchart which shows operations of the client device 103 according to Variation 2.

First the receiving unit 109 of the client device 103 downloads a GUI program from the server device 102 and stores the GUI program in the GUI program storage unit 110 (Step S2002). The GUI display processing unit 113 executes the GUI program to cause the display unit 112 to display a playback operation screen which is GUI content. The control unit 114 of the client device 103 selects "record" from functions displayed on the playback operation screen in response to an GUI operation by a user (Step S2004). This causes the control unit 114 to determine remaining capacity of a recording medium included in the client device 103 (Step S2006). The control unit 114 then determines whether or not the remaining capacity is larger than a threshold (Step S2008). In other words, the control unit 114 determines whether or not the whole of the video content item to be recorded can be stored in the recording medium. The threshold may be a data size of the video content item to be recorded or a predetermined value.

When determining that the remaining capacity is larger in Step S2008 (YES in Step S2008), the control unit 114 causes a processing unit, which includes the function of recording, of the client device 103 to record the video content item to be recorded (Step S2010). On the other hand, when determining that the remaining capacity is equal to or smaller than the threshold (NO in Step S2008), the control unit 114 requests the server device 102 to record the video content item to be recorded (Step S2012).

Figure 14:
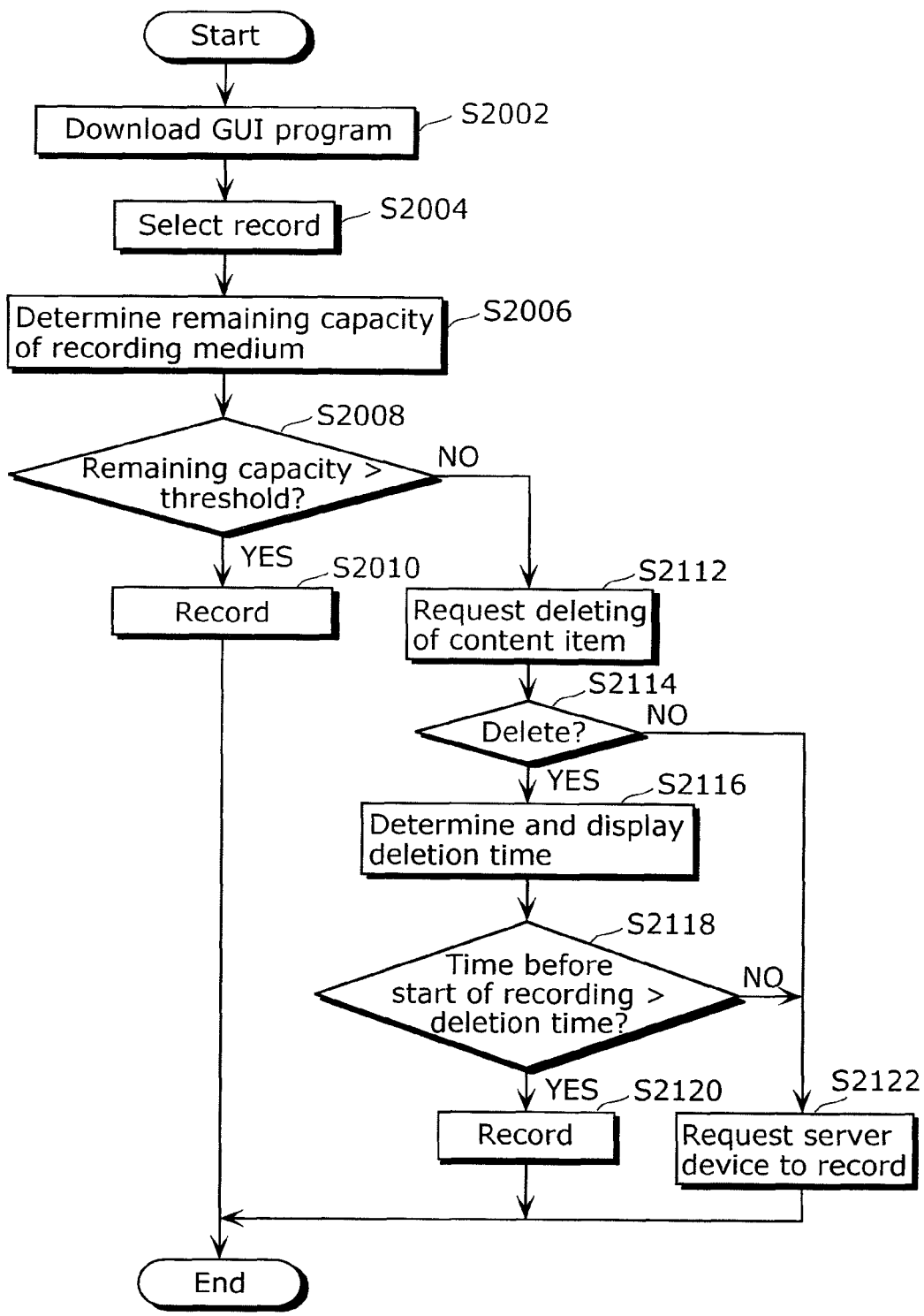
FIG. 14 is a flowchart which shows other operations of the client device according to Variation 2 of Embodiment 1 of the present invention.

FIG. 14 is a flowchart which shows other operations of the client device 103 according to Variation 2. In this case, recording is what is called preset recording. The recording is performed not when the function is selected but when distribution of a video content item to be recorded starts after a period of time (time before start of recording) which is from the selection of the function to the starts of the distribution of the video content item.

The client device 103 performs the same processing from the Steps S2002 to S2006, and the control unit 114 determines whether or not the remaining capacity is larger than the threshold (Step S2008).

When determining that the remaining capacity is larger in Step S2008 (YES in Step S2008), the control unit 114 causes the processing unit, which includes the function of recording, of the client device 103 to record the video content item to be recorded after the time before start of recording elapses (Step S2010). On the other hand, when determining that the remaining capacity is equal to or smaller than the threshold (NO in Step S2008), first the control unit 114 causes the display unit 112 to display a message. The message prompts deleting of a content item stored in the recording medium included in the client device 103 to request the user to delete the content item (Step S2112). The control unit 114 determines whether or not the user has selected the deleting in response to a GUI operation by the user (Step S2114).

When determining that the user has selected deleting (YES in Step S2114), the control unit 114 determines a deletion time which is required for the deleting of the content item until the remaining capacity becomes equal to or larger than the threshold. The deletion time is indicated using a progress bar displayed on the display unit 112 (Step S2116). The control unit 114 further determines whether or not the time before start of recording is longer than the deletion time determined in Step S2116 (Step S2118). When determining that the time before start of recording is longer (YES in Steps S2118), the control unit 114 causes the processing unit to record the content item to be recorded after the time before start of recording elapses (Step S2120).

On the other hand, when determining that the user has not selected the deleting in Step S2114 (NO in Step S2114) or that the time before start of recording is not longer (NO in Step S2118), the control unit 114 requests the server device 102 to perform the preset recording of the video content item to be recorded (Step S2122).

The GUI program transmitted to the client device 103 by the server device 102 according to Variation 2 thus causes the client device 103 to perform a step of determining whether or not a function selected by a user is available on the client device 103 even when the client device 103 includes the function and a step of requesting the server device 102 to perform processing using the function when the client device 103 determines that the function is not available thereon. With this, for example, the client device 103 having a function of recording avoids missing of part of a video content item to be recorded because a user selects the function of recording when remaining capacity of the recording medium is insufficient.

Although the client device 103 downloads and executes the GUI program to make the determinations and make the request to the server device 102 in Variation 2, the client device 103 may make such determinations and request for itself without downloading and executing the GUI program.

Furthermore, although the server device 102 according to the present invention is described in Embodiment 1 and Variations 1 and 2 thereof, the present invention is not limited to them.

For example, although descriptions in Embodiment 1 and Variations 1 and 2 focus on functions such as fast-forward of a video content item, edit of a still-image content item, record of a video content item and alternative processing for them, it should be understood that the server device according to the present invention may perform alternative processing for functions other than them. The configurations and processing operations in Embodiment 1 and Variations 1 and 2 thereof may be combined with one another to the extent that there is no inconsistency among them.

Embodiment 2

A client device according to the Embodiment 2 has a feature that the client device which is connected to, for example, an old-generation server device, has more functions than the server device and displays the functions including the one which the server device lacks in a GUI playback operation screen designated by the server device, so that the client device performs processing using the function which the server device lacks.

Figure 15:
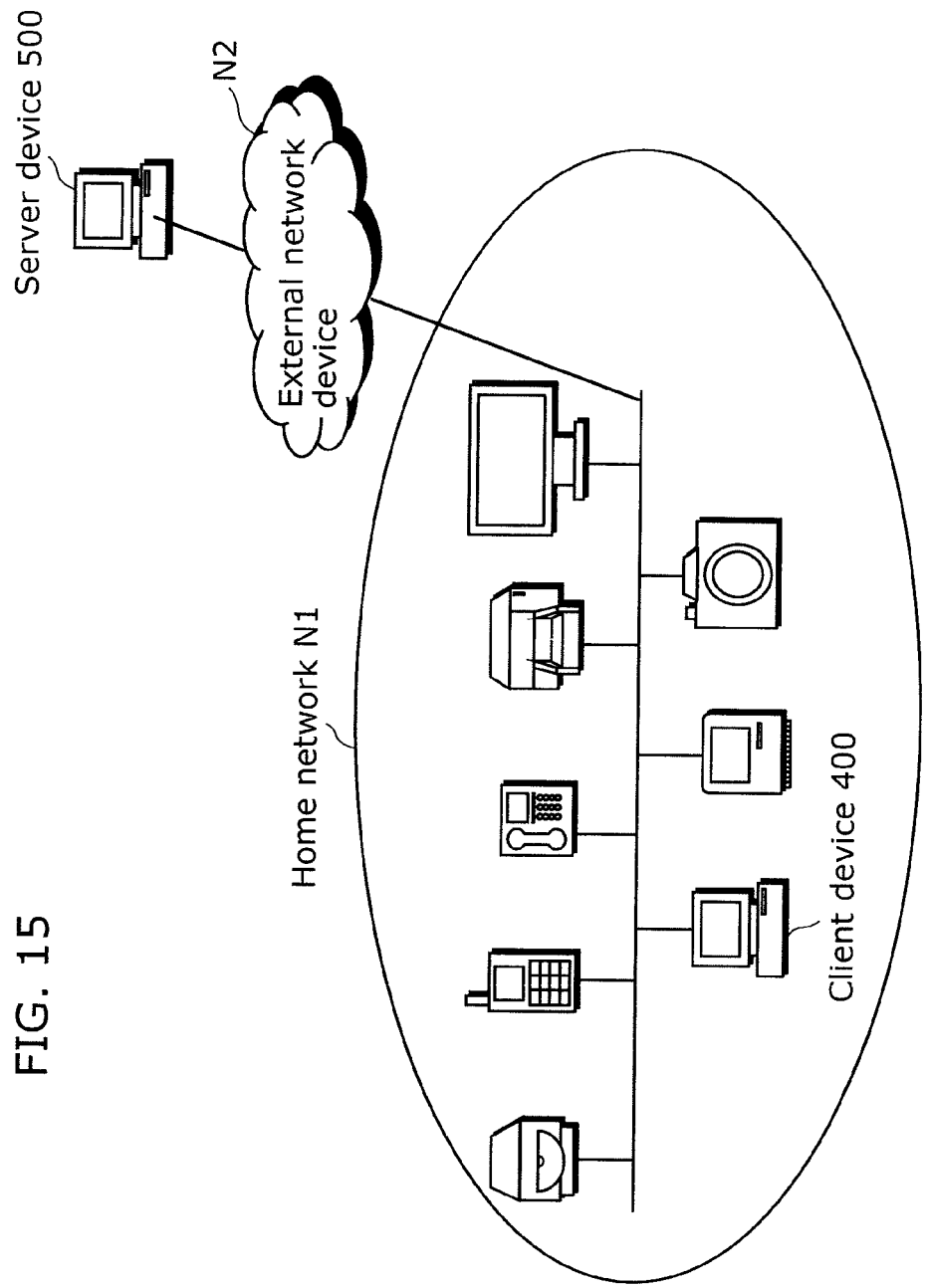
FIG. 15 is a configuration diagram of a home network including a client device according to Embodiment 2 of the present invention.

FIG. 15 is a configuration diagram of a home network including a client device according to Embodiment 2.

A home network N1 includes a client device 400 and constructed of a wired network or a wireless network. As in the case of Embodiment 1, the client device 400 may be a device such as a TV, a recorder, a player, a mobile phone, a land-line phone, a printer, a fax, a PDA, a PC, a digital camera, a refrigerator, a microwave oven, and a washing machine. Like the client device 400, the server device 500 may be a device such as a TV, a recorder, a player, a mobile phone, a land-line phone, a printer, a fax, a PDA, a PC, a digital camera, a car navigation system, a refrigerator, a microwave oven, and a washing machine.

The home network N1 is connected to the server device 500 via an external network N2. The client device 400 and the server device 500 work together to update a GUI of the client device 400. The server device 500 may be a device present on the home network N1. In this case, the client device 400 and the server device 500 present on the home network N1 work together to display GUI content of the server device 500 on the client device 400.

Figure 16:
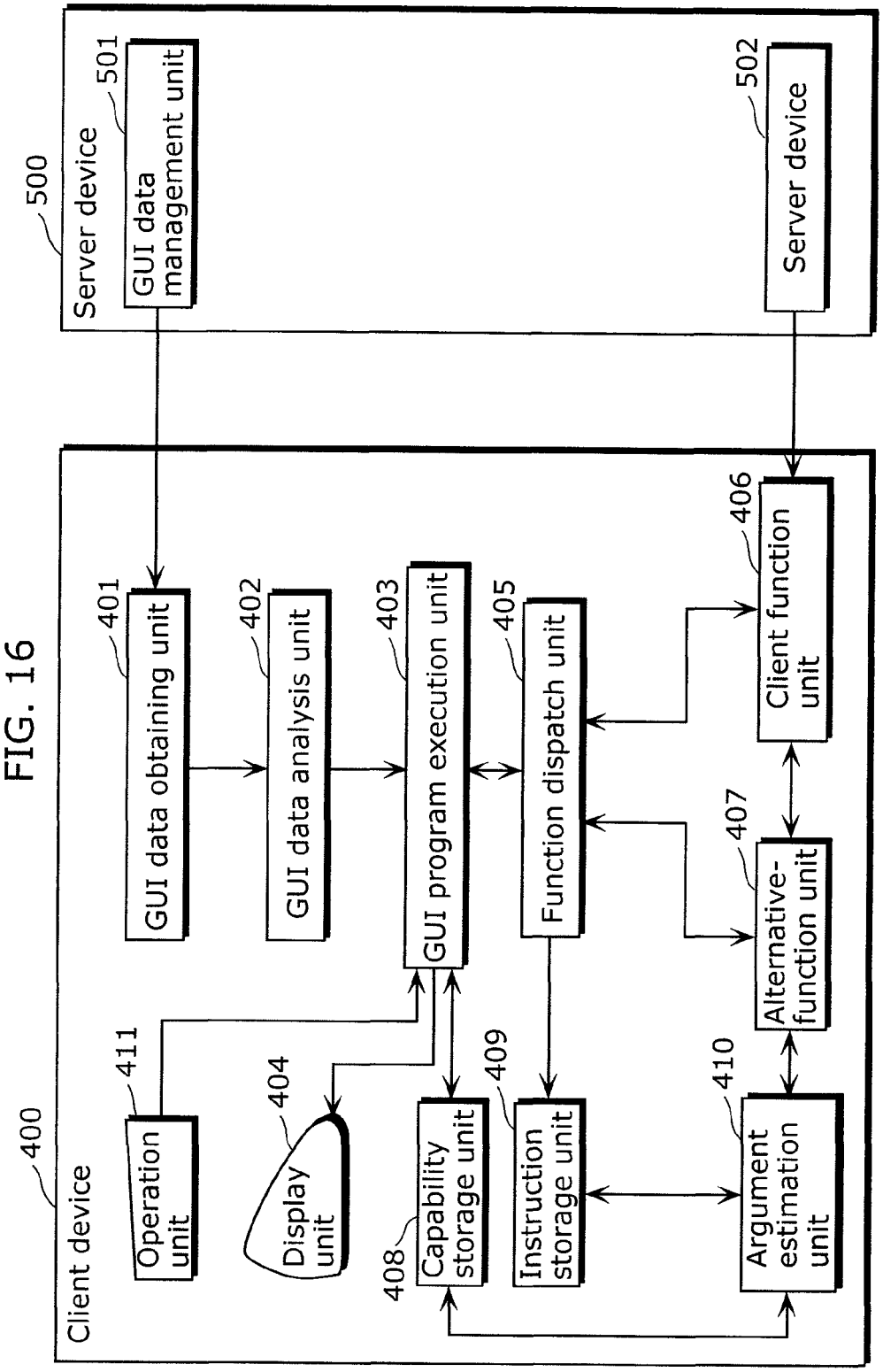
FIG. 16 is block diagram of the client device according to Embodiment 2 of the present invention.

FIG. 16 is a block diagram of the client device 400 according to Embodiment 2.

A GUI data obtaining unit 401 obtains GUI data from a GUI data management unit 501 on the server device 500. The GUI data is written in Hyper Text Markup Language (HTML), Extensible Markup Language (XML), or a programming language such as JavaScript and Java. A GUI data analysis unit 402 analyzes the GUI data obtained by the GUI data obtaining unit 401 and generates a GUI program. The GUI program execution unit 403 executes the GUI program generated by the GUI data analysis unit 402 and provides a GUI by requesting the display unit 404 to display it. In other words, the GUI program execution unit 403 causes the display unit 404 to display GUI content by executing the GUI program to generate the GUI content. The GUI content is an image to be used for user's operations.

A function dispatch unit 405 calls a client function unit 406 or an alternative-function unit 407, which are described below, using identifiers which indicate functions. The function dispatch unit 405 is called when the GUI program execution unit 403 calls functions on the client device 400 or the server device 500. In other words, the GUI program execution unit 403 calls functions on the client device 400 or the server device 500 not directly but indirectly by causing the function dispatch unit 405 to use the identifiers.

The client function unit 406 includes functions for images and functions for calling functions which the server device 500 includes. The functions for images of the client function unit 406 and a server function unit 502 are intended for handling content items such as still pictures and videos. Specifically, the functions are application functions such as video playback, video record, preset video record, and picture slide show.

The instruction storage unit 409 stores requests to the client function unit 406 called by the function dispatch unit 405. Information stored in the instruction storage unit 409 includes identifiers to identify functions to be called, arguments of the identifiers, and time of callings.

A capability storage unit 408 stores information for identifying functions which the client function unit 406 includes. The information for identifying functions included in the client function unit 406 includes text strings to be displayed when functions are shown to users, identifiers to identify functions to be called, and arguments of the identifiers. The GUI program execution unit 403 queries the capability storage unit 408 as to functions included in the client function unit 406 using the text strings to be displayed when functions are shown to users, the identifiers to identify functions to be called, or the arguments of the identifiers. The GUI program execution unit 403 finds from a result of the query functions which the server device 500 lacks but the client device 400 includes (hereinafter referred to as difference functions), and reflects information about the difference functions on the GUI content generated from the GUI data.

The alternative-function unit 407 is called from the GUI program execution unit 403 via the function dispatch unit 405 when one of the difference functions displayed as GUI content items is called from the GUI program execution unit 403 as an alternative function. The alternative function unit 407 then collects information necessary to call the client function unit 406 from an argument estimation unit 410, calls the client function unit 406, and causes the client function unit 406 to perform processing using the alternative function.

The argument estimation unit 410 estimates an argument necessary for the alternative-function unit 407 to call the client function unit 406 from the information stored in the instruction storage unit 409 and in the capability storage unit 408.

The operation unit 411 receives operations by the user of the client device 400 and notifies the GUI program execution unit 403 of results of the operations.

For example, the operation unit 411 may be a keyboard, a remote control, a mouse, a pointing device, a touch panel, a speech-recognition device, or a gesture-recognition device. The display unit 404 displays, for example, GUI content which lists video content items, GUI content which lists functions for the video content items, and the video content items in response to requests from the GUI program execution unit 403.

The server device 500 includes the GUI data management unit 501 and the server function unit 502. The GUI data management unit 501 holds the GUI data and transmits the GUI data to the GUI data obtaining unit 401 of the client device 400. The GUI content generated from the GUI data shows a list of the video content items which the server device 500 has and a list of functions which the server device 500 using diagrams, characters, and symbols. The server function unit 502 has one or more video content items and a list of the video content items. The server function unit 502 has functions for the video content items such as playback and stop.

The following describes a screen displayed on the client device 400 when the client device 400 obtains the GUI data managed by the GUI data management unit 501 and operations of the client device 400 with reference to FIG. 17 to FIG. 23. It is assumed here that the server function unit 502 provides functions to be used for videos. It is also assumed here that the server device 500 cannot provides the client device 400 with processing using special playback functions for video content items (for example, video fast-forward, video rewind), and that the client device 400 can perform such special playback functions for video content items for itself. In other words, the GUI data transmitted from the server device 500 includes data only on normal playback functions among functions for video content items and lacks data on special playback functions which the client function unit 406 includes.

Although functions in Embodiment 2 are described using special playback for video content items as examples, the functions may be not for video content items but for other content items as mentioned above.

Figure 17:
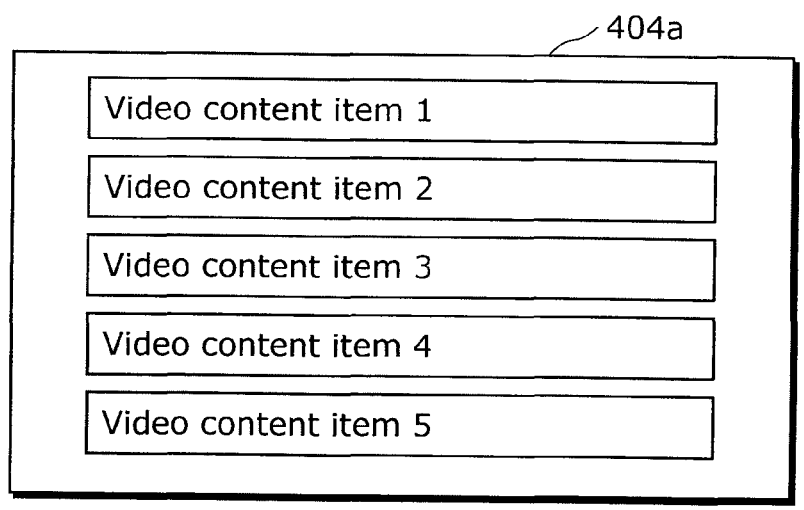
FIG. 17 shows an exemplary screen of a list of video content items displayed on a display unit according to Embodiment 2 of the present invention.

FIG. 17 shows an exemplary screen of a list of video content items displayed on the display unit 404.

The client device 400 obtains the GUI data managed by the GUI data management unit 501 of the server device 500, and then further obtains a list of the video content items from the server function unit 502 of the server device 500. The client device 400 generates a screen which shows the list of the video content items as GUI content based on the GUI data and the list of the video content items, and displays the screen (video content item list screen) 404a on the display unit 404. The user uses the operation unit 411 of the client device 400 to select a video content item to be played from the list.

Figure 18:
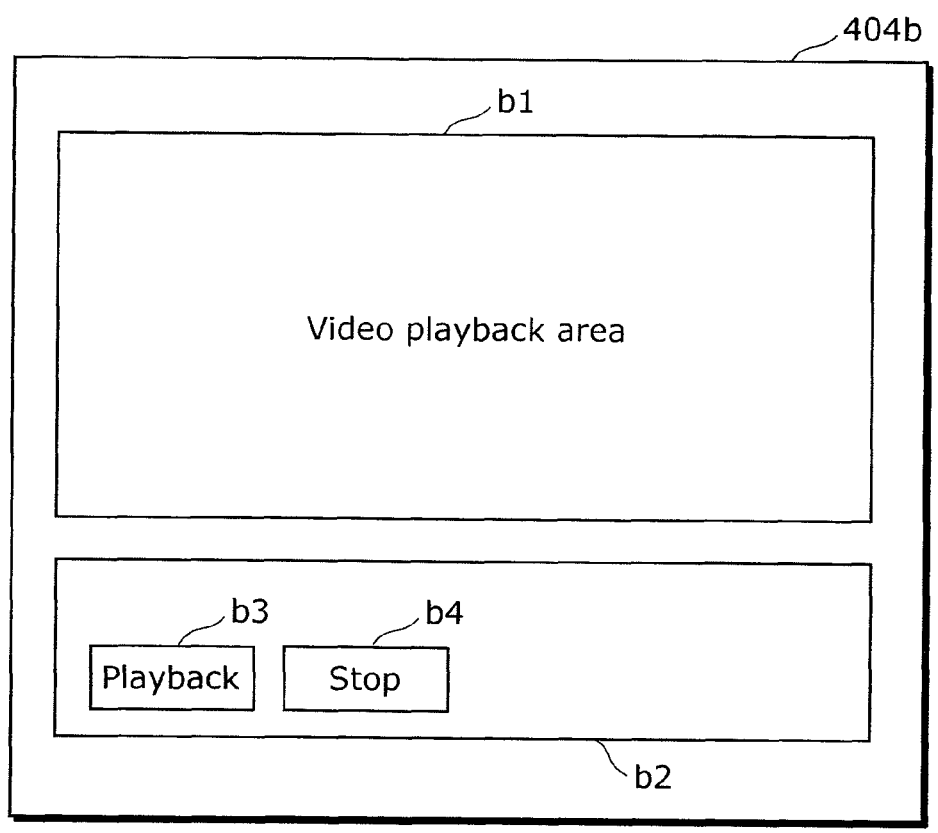
FIG. 18 shows an exemplary screen of a playback operation screen displayed on the display unit according to Embodiment 2 of the present invention.

FIG. 18 shows an exemplary screen of a playback operation screen displayed on the display unit 404.

When the video content item to be played is selected, the client device 400 generates a playback operation screen 404b as GUI content and displays it on the display unit 404. The playback operation screen 404b includes a video playback area b1 and a video control area b2. The video content item to be played is displayed in the video playback area b1. The video control area b2 is used for controlling of playback of the video content item. The client device 400 obtains the video content item to be played from the server function unit 502 of the server device 500, decodes the video content item, and then displays images of the decoded video content item in the video playback area b1.

The video control area b2 includes a button b3 to request the server function unit 502 to play the video content item and a button b4 to request the server function unit 502 to stop playing the video content item. Here, the client device 400 generates the playback operation screen 404b and displays it on the display unit 404 by executing the GUI program generated from the GUI data to use functions indicated in the GUI data. Specifically, the client device 400 has the buttons b3 and b4 displayed because the GUI data indicates functions of playback and stop. The video control area b2 is displayed in this manner when there is no difference function, which is included in the functions of the client function unit 406 of the client device 400 and not indicated by the GUI data.

Figure 19:
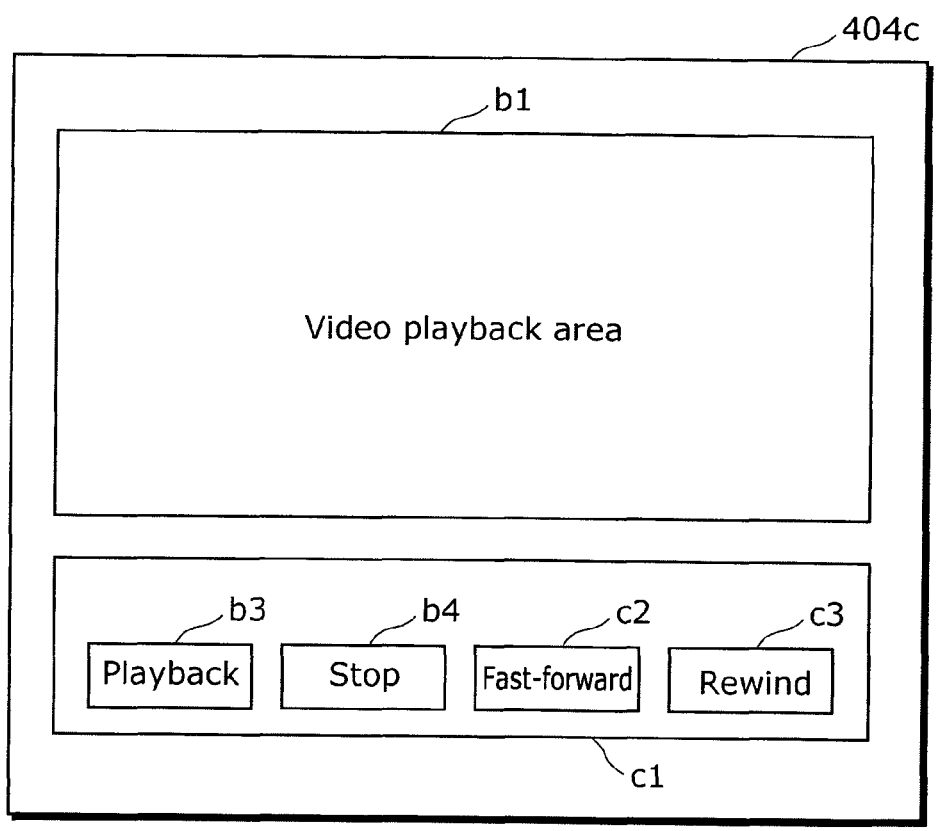
FIG. 19 shows another exemplary playback operation screen displayed on the display unit according to Embodiment 2 of the present invention.

FIG. 19 shows another exemplary playback operation screen displayed on the display unit 404.

When a video content item to be played is selected and there are difference functions, the client device 400 generates a playback operation screen 404c as GUI content and displays it on the display unit 404. The playback operation screen 404c includes the video playback area b1 and a video control area c1. The video control area c1 shows the difference functions. The client device 400 obtains a video content item to be played from the server function unit 502 of the server device 500, decodes the video content item, and then displays images of the decoded video content item in the video playback area b1.

The video control area c1 includes not only the buttons b3 and b4 but also a button c2 to request fast-forward of the video content item and a button c3 to request rewind of the video content item. The fast-forward and rewind are included in the difference functions. Here, the client device 400 generates the playback operation screen 404c and displays it on the display unit 404 by executing the GUI program generated from the GUI data to use functions indicated in the GUI data. Specifically, the client device 400 has the buttons b3 and b4 displayed because the GUI data indicates functions of playback and stop. Furthermore, the client device 400 according to Embodiment 2 assigns the difference functions fast-forward and rewind to the video control area c1 and has the buttons c2 and c3 displayed because the difference functions are fast-forward and rewind.

A processing procedure of the client device 400 and the server device 500 according to Embodiment 2 will be described with reference to FIG. 20 to FIG. 23.

Figure 20:
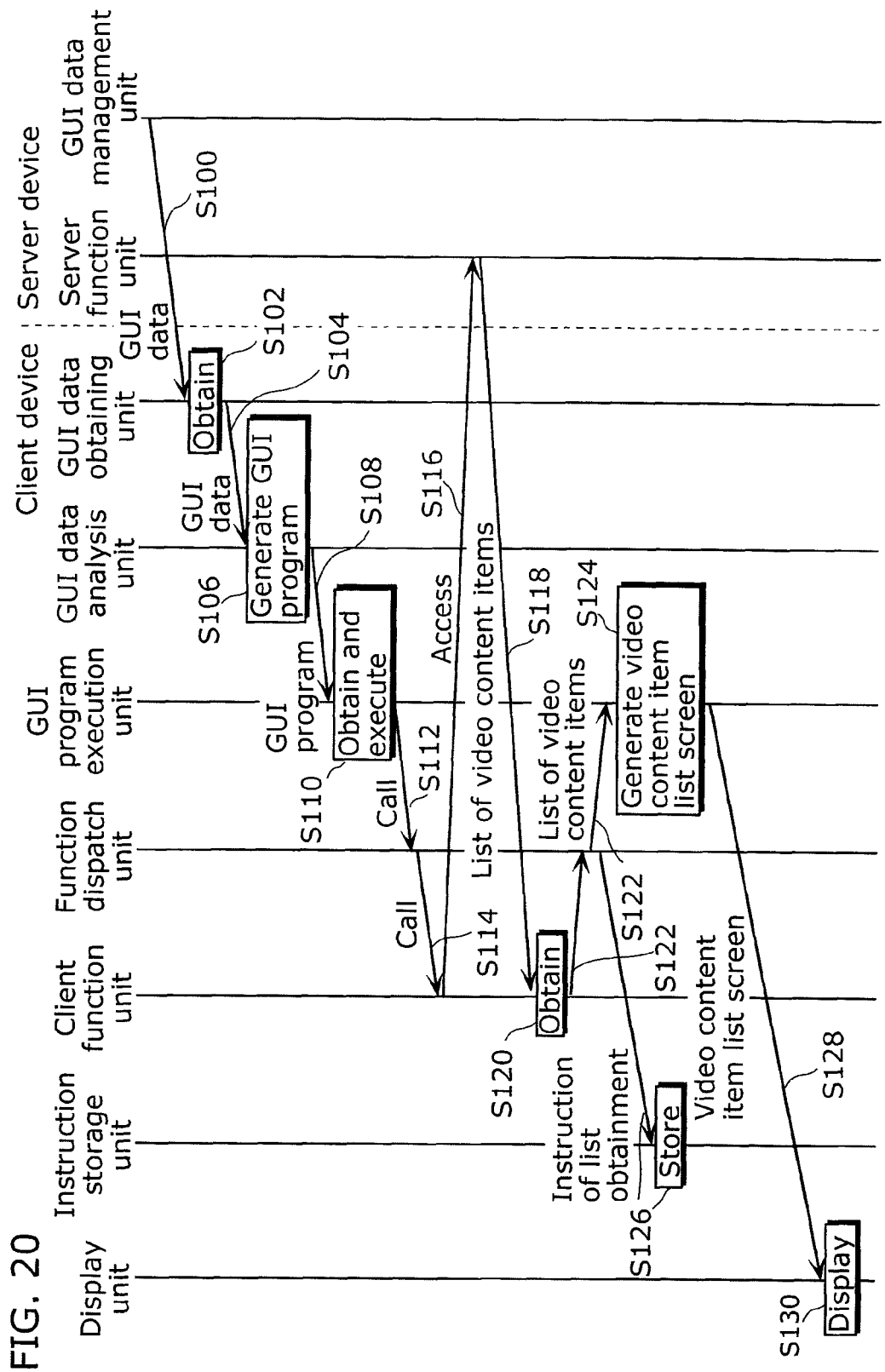
FIG. 20 is a sequence diagram which shows processing of displaying a video content item list screen performed by the client device according to Embodiment 2 of the present invention.

FIG. 20 is a sequence diagram which shows processing to display a video content item list screen 404a performed by the client device 400.

First, the GUI data management unit 501 of the server device 500 transmits GUI data which the GUI data management unit 501 manages to the client device 400 (Step S100), and the GUI data obtaining unit 401 obtains the GUI data (Step S102). Next, the GUI data obtaining unit 401 provides the GUI data obtained from the GUI data management unit 501 for the GUI data analysis unit 402 (Step S104). The GUI data analysis unit 402 obtains and analyzes the GUI data, and then generates a GUI program from a result of the analysis (Step S106). The GUI data analysis unit 402 then provides the generated GUI program for the GUI program execution unit 403 (Step S108).

The GUI program execution unit 403 obtains and executes the GUI program (Step S110). As a result, the GUI program execution unit 403 calls the function dispatch unit 405 for a function of obtaining a list of video content items (function=video content list) in order to make the video content item list screen 404a which is a list of available video content items (Step S112). The list of video content items includes content IDs for uniquely identifying the video content items.

When called by the GUI program execution unit 403, the function dispatch unit 405 calls the client function unit 406 which has the function (function=video content list) (Step S114). The client function unit 406 accesses the server function unit 502 of the server device 500 (Step S116) and causes the server function unit 502 to transmit the list of video content items (Step S118) to obtain the list of video content items (Step S120). The client function unit 406 provides the obtained list of video content items to the GUI program execution unit 403 via the function dispatch unit 405 (Step S122). As a result, the GUI program execution unit 403 obtains the list of video content items, and then generates the video content item list screen 404a to show the list (Step S124).

The function dispatch unit 405 stores information that the list of video content items has been obtained, specifically, the function called in Step S114 (function=video content list) in the instruction storage unit 409 as an instruction of list obtainment (Step S126). The GUI program execution unit 403 transmits to the display unit 404 the video content item list screen 404a generated using the obtained list of video content items (Step S128). As a result, the display unit 404 displays the video content item list screen 404a as shown in FIG. 17 (Step S130).

Figure 21:
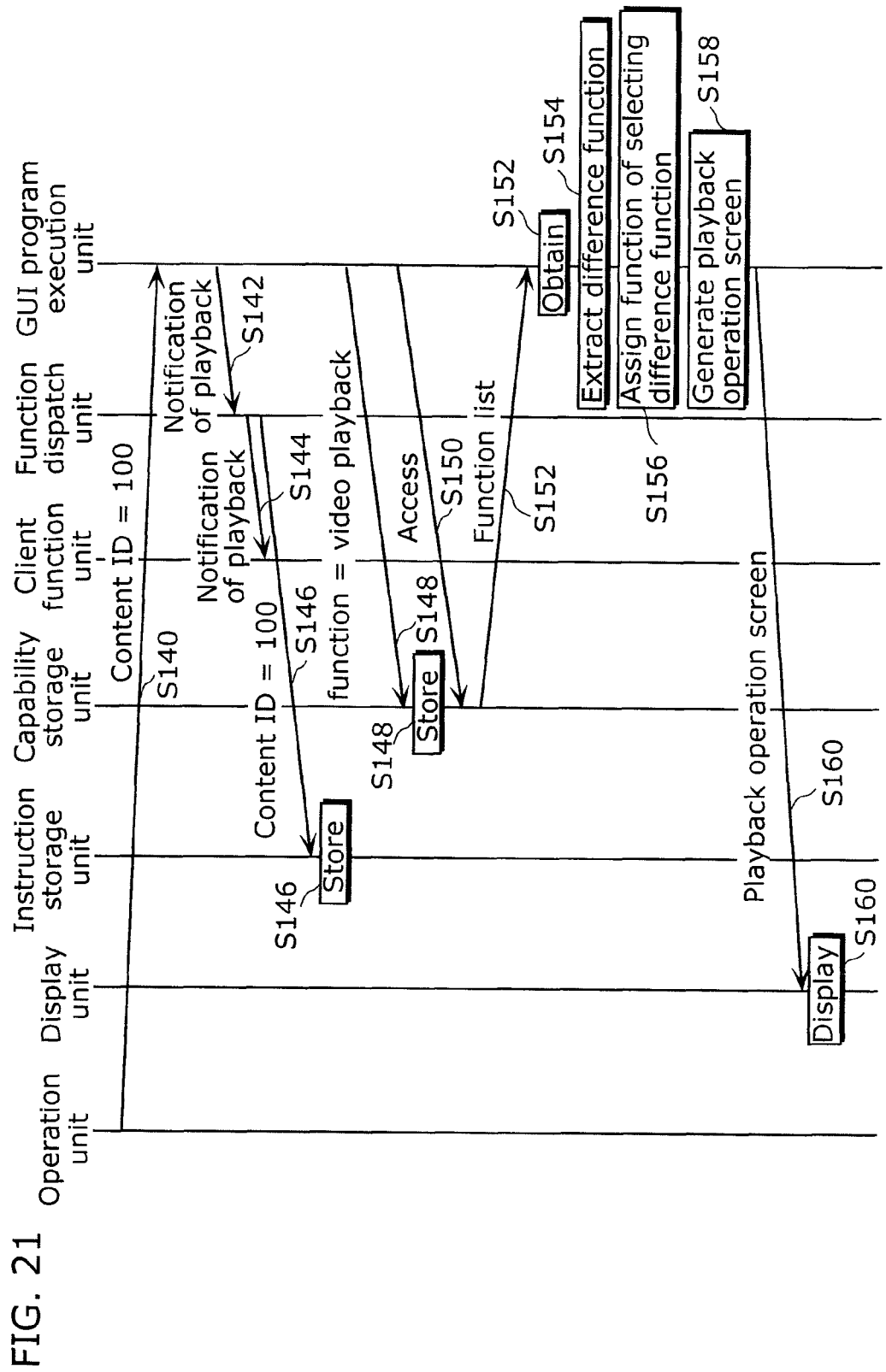
FIG. 21 is a sequence diagram which shows processing performed by the client device when a video content item to be played is selected according to Embodiment 2 of the present invention.

FIG. 21 is a sequence diagram which shows processing performed by the client device 400 when a video content item to be played is selected.

A user viewing the video content item list screen 404a displayed on the display unit 404 uses the operation unit 411 to select a video content item to be played from the list of the video content items. The operation unit 411 then notifies the GUI program execution unit 403 that a video content item having a content ID=100 is selected (Step S140).

The GUI program execution unit 403 notifies the function dispatch unit 405 of a request for playback of the video content item (function=video playback) having the content ID=100 (Step S142). The function dispatch unit 405 notifies the client function unit 406, which includes a function of video playback, of the request for playback of the video content item (function=video playback) having the content ID=100 (Step S144). The function dispatch unit 405 further stores in the instruction storage unit 409 information that the content ID of the video content item in the notification in Step S144 is 100 (content ID=100) (Step S146). The GUI program execution unit 403 stores in the capability storage unit 408 function information (function=video playback) which indicates that the function for the video content item in the notification in Step S142 is playback (Step S148).

Next, the GUI program execution unit 403 accesses the capability storage unit 408 (Step S150) and obtains from the capability storage unit 408 a function list which includes functions available for video content items (Step S152). For example, the GUI program execution unit 403 obtains a function list which includes playback, stop, fast-forward, and rewind for video content items.

The GUI program execution unit 403 extracts difference functions which are differences between the functions listed in the function list obtained from the capability storage unit 408 and the functions which the GUI data indicates (Step S154). For example, it is assumed that the functions indicated by the GUI data include neither fast-forward nor rewind for video content items and that the functions listed in the function list of the client device 400 include fast-forward and rewind for video content items. In this case, the GUI program execution unit 403 extracts the two functions, fast-forward and rewind (special playback functions), for video content items as the difference functions. The extracted difference functions need not be such special playback functions.

The GUI program execution unit 403 assigns, to a screen to be displayed, a function of selecting to allow the user to select the difference functions for vide content items, fast-forward and rewind (Step S156). The function may be assigned to the screen by dynamically adding information on the function of selecting to the screen to be displayed or by assigning to a key provided on the screen beforehand. The GUI program execution unit 403 further generates the playback operation screen 404c using the screen to which the function of selecting in Step S156 is assigned (Step S158), and then causes the display unit 404 to display the playback operation screen 404c (Step S160). When there is any difference function, the display unit 404 thus displays the playback operation screen 404c as shown in FIG. 19. Specifically, the button c2 is added to the video control area c1 of the playback operation screen 404c, and a function of selecting to allow the user to select one of the difference functions, fast-forward, is assigned to the button c2. Furthermore, the button c3 is added to the video control area c1, and a function of selecting to allow the user to select the other one of the difference functions, rewind, is assigned to the button c3. When there is no difference function, the display unit 404 displays the playback operation screen 404b as shown in FIG. 18.

Figure 22:
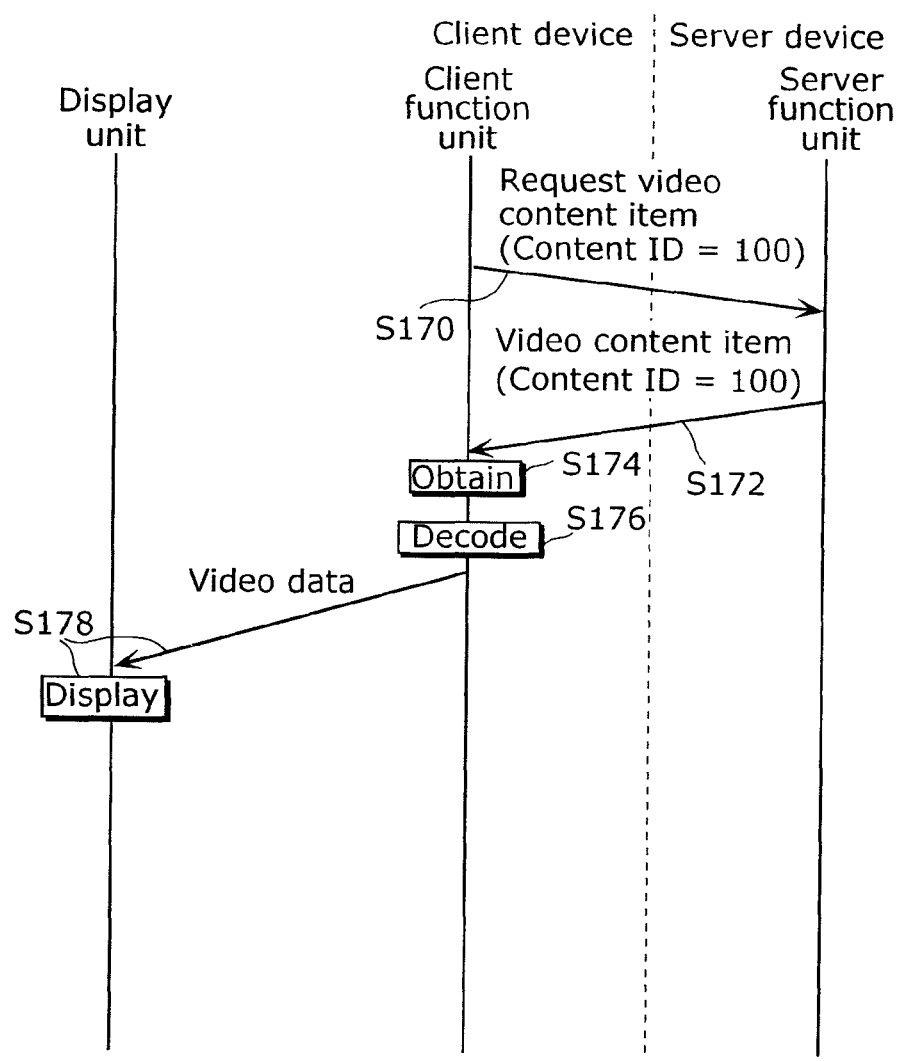
FIG. 22 is a sequence diagram which shows processing of normal playback of a video content item performed by the client device according to Embodiment 2 of the present invention.

FIG. 22 is a sequence diagram which shows processing of normal playback of a video content item performed by the client device 400.

When notified of playback (function=video playback) of the video content item having the content ID=100 in Step S144 shown in FIG. 21, the client function unit 406 requests the server function unit 502 of the server device 500 to provide a stream of the video content item of the content ID=100 (Step S170). As a result, the server function unit 502 transmits the stream of the video content item (Step S172), and the client function unit 406 obtains the transmitted stream of the video content item (Step S174). The client function unit 406 decodes the obtained stream of the video content item, and then converts the decoded stream to video data which the display unit 404 can display (Step S176). The client function unit 406 provides the display unit 404 with the video data converted from the stream to have images of the video content item displayed in the video playback area b1 of the playback operation screen 404c shown in FIG. 19 (Step S178).

Figure 23:
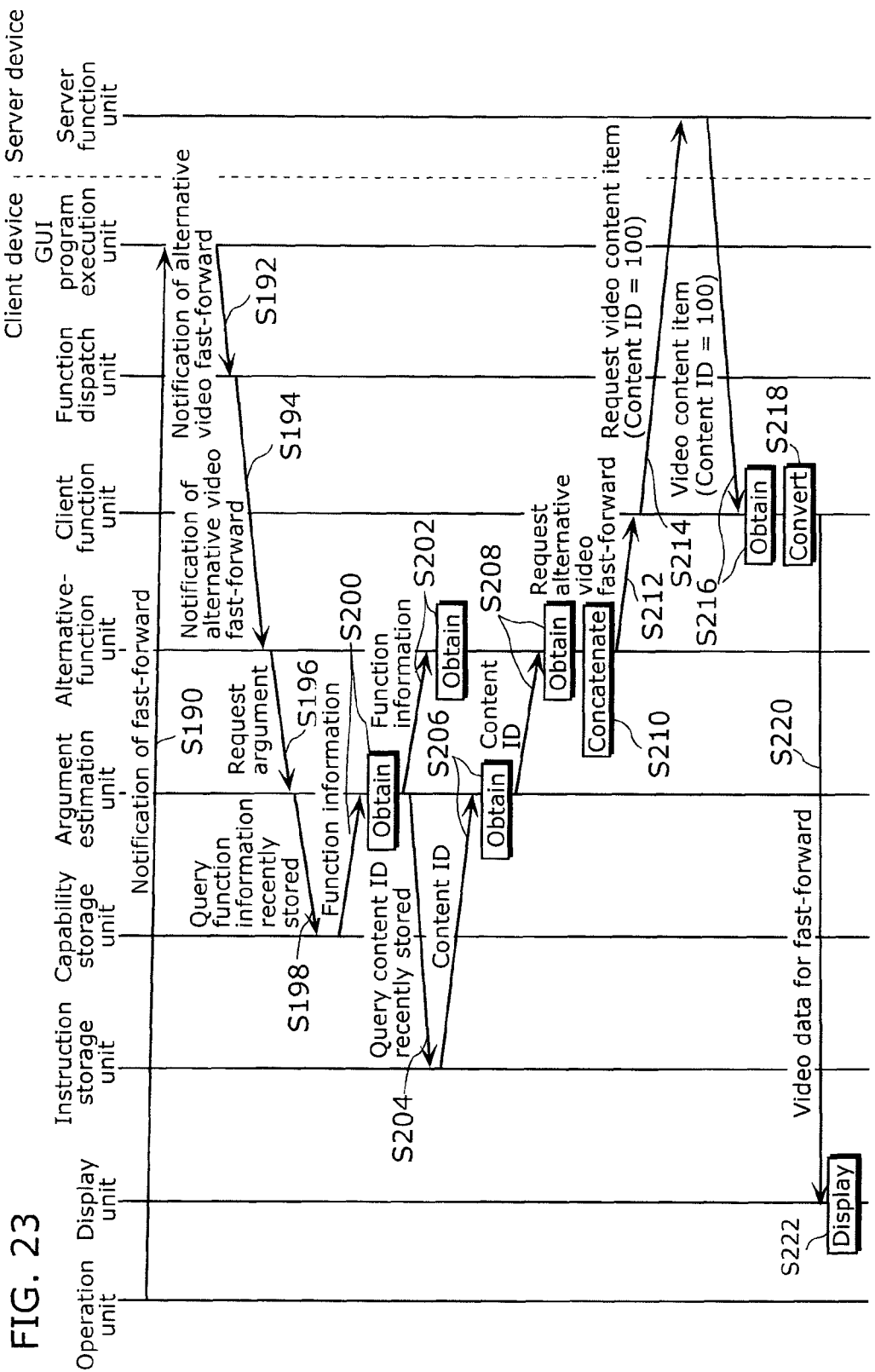
FIG. 23 is a sequence diagram which shows processing of fast-forward of a video content item performed by the client device according to Embodiment 2 of the present invention.

FIG. 23 is a sequence diagram which shows processing of fast-forward of a video content item performed by the client device 400.

The user uses the operation unit 411 to select the button c2 of the playback operation screen 404c shown in FIG. 19 in order to fast-forward the video content item. As described above, the function of selecting to allow the user to select one of the difference functions, fast-forward, is assigned to the button c2. In this case, the client device 400 is requested to provide the user with the function of fast-forward which the server device 500 includes but the client device 400 lacks.

As a result, the operation unit 411 notifies the GUI program execution unit 403 of the request for the difference function, fast-forward (Step S190). The GUI program execution unit 403 handles the fast-forward of the difference function extracted in Step S154 in FIG. 21 as an alternative function (alternative video fast-forward), and notifies the function dispatch unit 405 of the request for the alternative video fast-forward (subFunction=video fast-forward) (Step S192). The function dispatch unit 405 notifies the alternative-function unit 407 of the request for the alternative video fast-forward (subFunction=video fast-forward) (Step S194).

The alternative-function unit 407 requests the argument estimation unit 410 to provide the alternative function unit 407 with an argument necessary to cause the client function unit 406 to perform processing of the alternative video fast-forward (Step S196). The argument estimation unit 410 queries the capability storage unit 408 as to function information on the alternative video fast-forward (Step S198) to obtain the function information (Step S200). Here, the argument estimation unit 410 obtains the function information recently stored in Step S148 in FIG. 21, playback (function=video playback) as an argument. The argument estimation unit 410 provides the obtained argument, playback (function=video playback), for the alternative-function unit 407, and the alternative-function unit 407 obtains the argument, playback (function=video playback) (Step S202).

Subsequently, the argument estimation unit 410 queries the instruction storage unit 409 as to a content ID which has been recently applied to the playback (function=video playback) (Step S204), and thereby obtains "content ID=100" as an argument, which has been recently stored in Step S146 shown in FIG. 21 (Step S206). The argument estimation unit 410 provides the obtained argument "content ID=100" for the alternative-function unit 407, and the alternative-function unit 407 obtains "content ID=100" (Step S208).

The alternative-function unit 407 concatenates the arguments obtained from the argument estimation unit 410 (Step S210), and then requests the client function unit 406 to perform the processing of the alternative video fast-forward on the video content item having the content ID=100, which is being played (Step S212). The client function unit 406 requests the server function unit 502 to provide the stream of the video content item having the content ID=100 (Step S214), and obtains the stream of the video content item (Step S216). The stream of the video content item obtained here is not a stream of the video content item for fast-forward but the stream of the video content item for normal playback.

The client function unit 406 converts the obtained stream of the video content item into video data for fast-forward (Step S218). Subsequently, the client function unit 406 provides the display unit 404 with the video data for fast-forward (Step S220) to have images of the video data for fast-forward displayed in the video playback area b1 of the playback operation screen 404c shown in FIG. 19 (Step S222).

According to Embodiment 2, the client device 400 thus performs the function of fast-forward by performing alternative processing for fast-forward even when the GUI which the user uses is generated from the GUI data obtained from the server device 500 which lacks the function of fast-forward. Specifically, the client device 400 according to Embodiment 2 compares the functions of the server device 500 indicated in the GUI data obtained from the server device 500 and the functions which the client device 400 includes, and then displays functions which the client device 400 includes but the server device 500 lacks as difference functions in the playback operation screen 404c to accept selections from among the difference functions. When one of the difference functions is selected, the client device 400 performs processing corresponding to the selected difference function for itself in place of the server device 500. The client device 400 may thereby use all of its own functions regardless of the GUI data transmitted from the server device 500 which is of an old generation and inferior in functionality.

Although the client device 400 according to the present invention is described in Embodiment 2, the present invention is not limited thereto.

For example, although fast-forward of a video content item is given by way of example in Embodiment 2, the client device 400 may perform processing using a function such as rewind, double-speed playback, triple-speed playback, zoom-in, zoom-out or rotation as well as fast-forward. For example, when rewind is selected as one of the difference functions, the client device 400 requests the server device 500 to transmit frames from a frame at a selected position in the video content item to a previous (backward) frame sequentially in display order. In this case, the server device 500 sequentially transmits only frames requested by the client device 400 out of frames includes in the video content item using normal playback function of the server device 500. The processing of rewind performed by the client device 400 is not limited to the above-described processing and may be other processing.

Although the client device 400 performs processing using a function for video content items in Embodiment 2, it should be understood that the client device 400 according to the present invention may perform processing using not only functions for video content items but also functions for other content items such as still-image content items, music or voice. The configurations and processing operations in Embodiment 2 and those in Embodiment 1 and Variations 1 and 2 thereof may be combined with one another to the extent that there is no inconsistency among them.

Furthermore, all or part of the components may be implemented as large-scale integrated circuits (LSIs), which is integrated circuits, in the server device 102 according to Embodiment 1 shown in FIG. 3, the server device 102A according to Variation 1 thereof shown in FIG. 11, and the client device 400 according to Embodiment 2 shown in FIG. 16. These integrated circuits may be separate chips, and some or all of the integrated circuits may be integrated into a single chip. For example, all the functional blocks other than a memory block may be integrated into a single chip. For example, the components other than the GUI program storage unit 202 and the transmission unit 203 may be implemented as LSIs in the server device 102 shown in FIG. 3. The integrated circuits referred to as LSIs here may be referred to as ICs, system LSIs, super LSIs or ultra LSIs depending on the degree of integration.

The method of forming integrated circuitry is not limited to use of LSIs. Dedicated circuitry or a general-purpose processor may be used instead of LSIs. Also applicable is a field programmable gate array (FPGA), which allows post-manufacture programming, or a reconfigurable processor LSI, which allows post-manufacture reconfiguration of connection and setting of circuit cells therein. Furthermore, in the event that an advance in or derivation from semiconductor technology brings about an integrated circuitry technology whereby an LSI is replaced, the functional blocks may be obviously integrated using such new technology. The adaptation of biotechnology or the like is possible.

The devices according to Embodiment 1, Variations 1 and 2 thereof, and Embodiment 2 are specifically computer systems each including a microprocessor, a ROM, a RAM, a hard disk unit, a display unit, a keyboard, and a mouse. The RAM or the hard disk unit stores a computer program. The microprocessor works according to the computer program, so that each of the devices performs its own functions. Here, the computer program includes a combination of instruction codes to indicate instructions to the computer so that the computer provides predetermined functions.

The present invention may be implemented not only as the server device and the client device but also as processing methods or programs of the server device and the client device or a recording medium on which each of the programs is recorded.

INDUSTRIAL APPLICABILITY

Even when the server device according to the present invention is different in functionality from the client device to which the server device is connected, the server device absorbs the difference. Thus, the server device is applicable to embedded devices connected to client devices as server devices. Such embedded devices include TVs, recorders, players, mobile phones, land-line phones, printers, faxes, PDAs, PCs, digital cameras, refrigerators, micro ovens, and washing machines. The client device according to the present invention has an advantageous effect of allowing users of the client device to use functions which the server device lacks through the GUI content obtained from the server device. Thus, the client device is applicable to embedded devices connected to server devices as client devices. Such embedded devices include TVs, recorders, players, mobile phones, land-line phones, printers, faxes, PDAs, PCs, digital cameras, refrigerators, micro ovens, and washing machines.

REFERENCE SIGNS LIST

100: Home network
101: External network device
102, 102A: Server device
103, 103A: Client device
107: Video decoder
108: Request transmission unit
109: Receiving unit
110: GUI program storage unit
111: GUI program execution unit
112: Display unit
113: GUI display processing unit
114: Control unit
115: Old-device function information
116: Analysis unit
117: Still-image decoding unit
201: Request receiving unit
202: GUI program storage unit
203: Transmission unit
204: Device status determination unit
205: Status information storage unit
206: Function information storage unit
207, 207A: Alternative-processing providing unit
208: Error-message generation unit
209: Data transmission control unit
210: Transmit-data generation unit
211: Frame extraction unit
212: Video encoding unit
213: Content storage unit
214: Conversion unit
215: Still-image encoding unit
400: Client device
401: GUI data obtaining unit
402: GUI data analysis unit
403: GUI program execution unit
404: Display unit
405: Function dispatch unit
406: Client function unit
407: Alternative-function unit
408: Capability storage unit
409: Instruction storage unit
410: Argument estimation unit
500: Server device
501: GUI data management unit
502: Server function unit

The invention claimed is:

1. A server device comprising:
a transmitter that transmits an encoded content item to a client device;
a request receiver that receives, from the client device, a request for processing a content item using a function lacking from the client device, during a period in which the client device uses the content item;
a function information storage that stores function information, the function information indicating, for each of functions which said server device includes, alternative processing for obtaining, using a function which the client device includes, a result identical to a result of processing performed using the function which said server device includes;
an alternative-processing specifier that specifies alternative processing for enabling a video to be displayed, the alternative processing being specified with reference to the function information, the specified alternative processing corresponding to a function to be used for the requested processing from among the functions which said server device includes;
a decoder that decodes the content item;
an alternative processor that generates a content item for special playback by performing, as image processing on the decoded content item, the specified alternative processing for enabling a video to be displayed, the content item for special playback being a content item which is different from the decoded content item and is to be reproduced by the client device using a normal play back function as a video identical to a decoded video reproduced by said server device using a special function which is included in said server device and lacking from the client device; and
an encoder that encodes the content item for special playback generated from the decoded content item through the performance of the specified alternative processing by said alternative processor, wherein said transmitter transmits, to the client device, the encoded content item for special playback encoded by said encoder.

2. The server device according to claim 1, further comprising a GUI program storage that stores a graphical user interface (GUI) program, the GUI program causing the client device to (i) display an operation screen indicating at least one function which said server device includes and (ii) request said server device to perform processing using a function selected from the at least one function;
    wherein said transmitter transmits the GUI program to the client device, and
    wherein said request receiver receives a request for processing using a function which said server device includes but the client device lacks, the request being made through an execution of the GUI program by the client device.

3. The server device according to claim 2, wherein the GUI program further causes the client device to (i) determine whether the client device has or lacks the selected function and (ii) perform processing using the selected function when the client device determines that the client device includes the selected function, and the GUI program requests said server device to perform processing using the selected function when the client device determines that the client device lacks the selected function.

4. The server device according to claim 2, wherein the GUI program causes the client device to display the operation screen, the operation screen being a same as a server operation screen which is displayed on said server device and indicates the at least one function which said server device includes.

5. The server device according to one of claim 1,
    wherein said server device includes a status determiner,
    wherein the function information indicates, for each respective function of the functions which said server device includes, the respective function and alternative processing corresponding to the respective function, and
    wherein said alternative-processing specifier (i) determines whether or not the function information indicates the function to be used for the requested processing and (ii) specifies the alternative processing, when the function information indicates the function to be used for the requested processing and said status determiner determines that said server device is capable of performing the requested processing.

6. The server device according to one of claim 1,
    wherein said server device includes a status information storage and a status determiner, wherein, in said status information storage, setting information is stored as status information, the setting information indicating whether or not individual settings of said server device are adequate, and
    wherein said status determiner determines that said server device is capable of performing the requested processing when the setting information indicates that all the individual settings are adequate.

7. The server device according to one of claim 1,
    wherein said server device includes a status information storage and a status determiner, wherein, in said status information storage, conflict information is stored as status information, the conflict information indicating whether or not using each of the functions which said server device includes causes conflict with another function of said server device, and
    wherein said status determiner determines that said server device is capable of performing the requested processing when the conflict information indicates that using the function for the requested processing causes no conflict.

8. The server device according to one of claim 1,
    wherein said server device includes a status determiner,
    wherein said transmitter notifies the client device of a determination result which is a result of a determination by said status determiner,
    wherein said request receiver receives an access request generated by the client device depending on the result of the determination, and
    wherein said alternative processor performs the alternative processing depending on the access request received by said request receiver.

9. The server device according to claim 8,
    wherein said request receiver receives a request for alternative processing as the access request when the determination result indicates that said server device is capable of performing the requested processing, the request for alternative processing being generated by the client device, and
    wherein said alternative processor performs the alternative processing, when said status determiner determines that said server device is capable of performing the requested processing and said request receiver receives the request for alternative processing.

10. The server device according to claim 9,
    wherein said transmitter notifies the client device of the determination result and provides the client device with a first descriptor when said status determiner determines that said server device is capable of performing the requested processing, the first descriptor indicating a location of an alternative-processing program which performs the alternative processing,
    wherein said request receiver receives a request for access to the location indicated by the first descriptor as the request for alternative processing, and
    wherein said alternative processor performs the alternative processing by executing the alternative-processing program present in the location indicated by the first descriptor.

11. The server device according to claim 8,
    wherein said request receiver receives a request for error handling as the access request when the determination result indicates that said server device is not capable of performing the requested processing, the request for error handling being generated by the client device,
    wherein said alternative processor prohibits the alternative processing when said request receiver receives the request for error handling, and
    wherein said server device further comprises an error-message generator that transmits an error message to the client device when said request receiver receives the request for error handling, the error message providing a notification of occurrence of an error.

12. The server device according to claim 11,
    wherein said transmitter notifies the client device of the determination result and provides the client device with a second descriptor when said status determiner determines that said server device is not capable of performing the requested processing, the second descriptor indicating a location of an error-handling program which handles the error,
    wherein said request receiver receives a request for access to the location indicated by the second descriptor as the request for error handling, and wherein said error-message generator transmits the error message to the client device by executing the error-handling program present in the location indicated by the second descriptor.

13. The server device according to claim 8,
wherein said status determiner checks the determination result notified by the client device when said request receiver receives the request for access, and
wherein said alternative processor performs the alternative processing when the determination result notified by the client device indicates that said server device is capable of performing the requested processing.

14. The server device according to claim 2,
wherein said server device includes functions related to playback of a content item which is video data or still-image data, and
wherein said transmitter transmits, to the client device, the GUI program which causes the client device to display the operation screen indicating the functions related to the playback of the content item.

15. The server device according to claim 14, wherein the functions related to the playback of the content item include at least two of functions of playback, stop, fast-forward, rewind, rotation, enlargement, and reduction.

16. The server device according to claim 15, wherein the alternative processing performed by said alternative processor is the generation of the content item for special playback by extracting a predetermined frame from the decoded content item when said request receiver receives a request for the special playback of the content item.

17. A method of processing performed by a server device, said method comprising:
transmitting an encoded content item to a client device;
receiving, from the client device, a request for processing a content item using a function lacking from the client device, during a period in which the client device uses the content item;
using a function information storage unit to store function information indicating, for each of functions which the server device includes, alternative processing for obtaining, using a function which the client device includes, a result identical to a result of processing performed using the function which the server device includes;
specifying alternative processing for enabling a video to be displayed, the alternative processing being specified with reference to the function information, the specified alternative processing corresponding to a function used for the requested processing from among the functions which the server device includes;
decoding the content item;
generating a content item for special playback by performing, as image processing on the decoded content item, the specified alternative processing for enabling a video to be displayed, the content item for special playback being a content item which is different from the decoded content item and is to be reproduced by the client device using a normal play back function as a video identical to a decoded video reproduced by the server device using a special function which is included in the server device and lacking from the client device;
encoding the content item for special playback generated from the decoded content item through said performing of the specified alternative processing; and
transmitting, to the client device, the encoded content item for special playback encoded by said encoding.

18. A non-transitory computer-readable recording medium having a program recorded thereon, said program causing a computer, which is a server device, to execute a method comprising:
transmitting an encoded content item to a client device;
receiving, from the client device, a request for processing a content item using a function lacking from the client device, during a period in which the client device uses the content item;
using a function information storage unit to store function information indicating, for each of functions which the server device includes, alternative processing for obtaining, using a function which the client device includes, a result identical to a result of processing performed using the function which the server device includes;
specifying alternative processing for enabling a video to be displayed, the alternative processing being specified with reference to the function information, the specified alternative processing corresponding to a function used for the requested processing from among the functions which the server device includes;
decoding the content item;
generating a content item for special playback by performing, as image processing on the decoded content item, the specified alternative processing for enabling a video to be displayed, the content item for special playback being a content item which is different from the decoded content item and is to be reproduced by the client device using a normal play back function as a video identical to a decoded video reproduced by the server device using a special function which is included in the server device and lacking from the client device
encoding the content item for special playback generated from the decoded content item through said performing of the specified alternative processing; and
transmitting, to the client device, the encoded content item for special playback encoded by said encoding.

19. An integrated circuit comprising:
a transmitter that transmits an encoded content item to a client device;
a request receiver that receives, from the client device, a request for processing a content item using a function lacking from the client device, during a period in which the client device uses the content item;
a function information storage that stores function information, the function information indicating, for each of functions which said integrated circuit includes, alternative processing for obtaining, using a function which the client device includes, a result identical to a result of processing performed using the function which said integrated circuit includes;
an alternative-processing specifier that specifies alternative processing for enabling a video to be displayed, the alternative processing being specified with reference to the function information, the specified alternative processing corresponding to a function to be used for the requested processing from among the functions which said integrated circuit includes;
a decoder that decodes the content item;
an alternative processor that generates a content item for special playback by performing, as image processing on the decoded content item, the specified alternative processing for enabling a video to be displayed, the content item for special playback being a content item which is different from the decoded content item and is to be reproduced by the client device using a normal play back function as a video identical to a decoded video reproduced by said integrated circuit using a special function which is included in said integrated circuit and lacking from the client device; and an encoder that encodes the content item for special playback generated from the decoded content item through the performance of the specified alternative processing by said alternative processor, wherein said transmitter transmits, to the client device, the encoded content item for special playback encoded by said encoder.

20. The server device according to claim 1, further comprising:

a status information storage that stores status information, the status information indicating a status of said server device; and a status determiner that determines whether or not said server device is capable of performing requested processing, depending on the status of said server devices indicated by the status information, the requested processing being the processing requested by the client device, wherein said alternative processor performs the alternative processing when said status determiner determines that said server device is capable of performing the requested processing.

21. The server device according to claim 1, wherein the function information stored in said function information storage is a function information table indicating, for each of the functions which said server device includes, a URL as the alternative processing, the URL being a location of a program for performing the alternative processing, and wherein said alternative-processing specifier specifies alternative processing with reference to the function information table, the alternative processing corresponding to a function to be used for the requested processing from among the functions which said server device includes.

* * * * *